US009736341B2

(12) United States Patent
Honda et al.

(10) Patent No.: US 9,736,341 B2
(45) Date of Patent: Aug. 15, 2017

(54) ELECTROACOUSTIC TRANSDUCER AND INFORMATION PROCESSOR

(71) Applicant: Sony Computer Entertainment Inc., Tokyo (JP)

(72) Inventors: Shinichi Honda, Saitama (JP); Shinichiro Kondo, Kanagawa (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 14/987,037

(22) Filed: Jan. 4, 2016

(65) Prior Publication Data

US 2016/0212555 A1 Jul. 21, 2016

(30) Foreign Application Priority Data

Jan. 16, 2015 (JP) ................................ 2015-006585

(51) Int. Cl.

| | |
|---|---|
| ***H04R 29/00*** | (2006.01) |
| ***G06F 3/16*** | (2006.01) |
| ***H04N 5/225*** | (2006.01) |
| ***H04R 3/00*** | (2006.01) |
| ***H04R 1/02*** | (2006.01) |
| *H04R 17/00* | (2006.01) |

(52) U.S. Cl.
CPC ............. *H04N 5/225* (2013.01); *H04R 1/028* (2013.01); *H04R 17/00* (2013.01)

(58) Field of Classification Search
CPC ......... H04R 1/028; H04R 17/00; H04N 5/225
See application file for complete search history.

(56) References Cited

U.S. PATENT DOCUMENTS

| | | | | |
|---|---|---|---|---|
| 8,073,183 B2 * | 12/2011 | Liao | H04R 1/028 381/386 |
| 8,824,723 B2 * | 9/2014 | Lin | H04R 3/00 381/396 |
| 8,861,755 B2 * | 10/2014 | Ando | H04R 17/005 381/190 |
| 2004/0189151 A1 * | 9/2004 | Athanas | H04R 17/00 310/328 |

(Continued)

FOREIGN PATENT DOCUMENTS

| | | | |
|---|---|---|---|
| JP | 2014-017799 | 1/2014 | |
| JP | WO 2014207820 A1 * | 12/2014 | H04R 1/028 |

OTHER PUBLICATIONS

Nikkei Technology, "Fujifilm Unveils Bendable, Foldable, Roll-up Speakers,"; <URL: http://techon.nikkeibp.co.jp/english/NEWS_EN/20130201/263651/>; Motonobu Kawai, Nikkei Electronics; Feb. 1, 2013.

*Primary Examiner* — Brenda Bernardi
(74) *Attorney, Agent, or Firm* — Katten Muchin Rosenman LLP

(57) ABSTRACT

To provide a technology for offering new communication and entertainment options using speakers that are flexible enough to change their shapes. There is provided an electroacoustic transducer including an oscillator formed in a film shape, a detection section adapted to detect the apparent change in shape of the oscillator resulting from a user's act, and an audio output section adapted to output audio based on audio data stored in a given storage area via the oscillator if the change in shape is detected.

14 Claims, 19 Drawing Sheets

110

(56) References Cited

U.S. PATENT DOCUMENTS

| | | | | |
|---|---|---|---|---|
| 2005/0105748 | A1* | 5/2005 | Bartell | H04R 7/04 381/306 |
| 2009/0060249 | A1* | 3/2009 | Liou | H04R 7/06 381/386 |
| 2013/0016860 | A1* | 1/2013 | Boudouris | H04R 1/028 381/190 |
| 2013/0177181 | A1* | 7/2013 | Marcus | H04R 1/02 381/189 |
| 2014/0241551 | A1* | 8/2014 | Kim | H04R 3/12 381/306 |

* cited by examiner

110

110

ELECTROACOUSTIC TRANSDUCER AND INFORMATION PROCESSOR

BACKGROUND

The present disclosure relates to an electroacoustic transducer and an information processor.

Today, acoustic devices are becoming increasingly thin and light. For example, Japanese Patent Laid-Open No. 2014-017799 (hereinafter, referred to as Patent Document 1) describes a speaker and a microphone that use a piezoelectric film as an oscillator. On the other hand, NIKKEI TECHNOLOGY, "Fujifilm Unveils Bendable, Foldable, Roll-up Speakers," [online], [Searched Jan. 16, 2015], (hereinafter, referred to as Non-Patent Document 1) describes speakers using a highly flexible film material as a diaphragm.

SUMMARY

As described in Non-Patent Document 1, speakers that are flexible enough to change their shapes thanks to use of a film material are on their way to becoming commercially feasible. However, not sufficiently many proposals have been made as to how to use such speakers. It is desirable to provide a technology for offering new communication and entertainment options by using speakers that are flexible enough to change their shapes.

In order to solve the above problem, an electroacoustic transducer according to an embodiment of the present disclosure includes an oscillator, a detection section, and an audio output section. The oscillator is formed in a film shape. The detection section detects the apparent change in shape of the oscillator resulting from a user's act. The audio output section outputs audio based on audio data stored in a given storage area via the oscillator if the change in shape is detected.

Another embodiment of the present disclosure is also an electroacoustic transducer. The electroacoustic transducer includes an oscillator, a detection section, an audio recording section, and an audio output section. The oscillator is formed in a film shape. The detection section detects the apparent change in shape of the oscillator resulting from a user's act. The audio recording section stores given audio data in a given storage area if the change in shape is detected. The audio output section outputs audio based on audio data stored in the storage area via the oscillator if a given condition is satisfied.

Still another embodiment of the present disclosure is also an electroacoustic transducer. The electroacoustic transducer includes an oscillator, a reception section, and an audio output section. The oscillator is formed in a film shape. The reception section receives information about the change in shape transmitted from an external device that has detected the apparent change in shape of the oscillator resulting from a user's act. The audio output section outputs audio based on audio data stored in a given storage area via the oscillator if information about the shape change is received.

Still another embodiment of the present disclosure is an information processor. The information processor includes an acquisition section, a detection section, and a notification section. The acquisition section acquires imaging data from an imaging device adapted to image an electroacoustic transducer that includes an oscillator formed in a film shape. The detection section detects the apparent change in shape of the oscillator resulting from a user's act based on the imaging data. The notification section causes the electroacoustic transducer to output audio based on given audio data via the oscillator by transmitting, to the electroacoustic transducer, information about the change in shape if such a change is detected.

Still another embodiment of the present disclosure is an electroacoustic transducer. The electroacoustic transducer includes an oscillator, a reception section, an audio recording section, and an audio output section. The oscillator is formed in a film shape. The reception section receives information about the change in shape transmitted from an external device that has detected the apparent change in shape of the oscillator resulting from a user's act. The audio recording section stores given audio data in a given storage area if the information about the change in shape is detected. The audio output section outputs audio based on audio data stored in the storage area via the oscillator if a given condition is satisfied.

Still another embodiment of the present disclosure is an information processor. The information processor includes an acquisition section, a detection section, and a notification section. The acquisition section acquires imaging data from an imaging device adapted to image an electroacoustic transducer that includes an oscillator formed in a film shape. The detection section detects the apparent change in shape of the oscillator resulting from a user's act on the basis of the imaging data. The notification section causes the electroacoustic transducer to store given audio data to be output via the oscillator if a given condition is satisfied by transmitting, to the electroacoustic transducer, information about the change in shape if such a change is detected.

It should be noted that arbitrary combinations of the above components and arbitrary conversions of expressions of the present disclosure between "method," "system," "program," "recording medium storing a program," and so on are also effective as modes of the present disclosure.

The present disclosure offers new communication and entertainment options using speakers that are flexible enough to change their shapes.

DETAILED DESCRIPTION OF THE PREFERRED EMBODIMENTS

Figure 1:
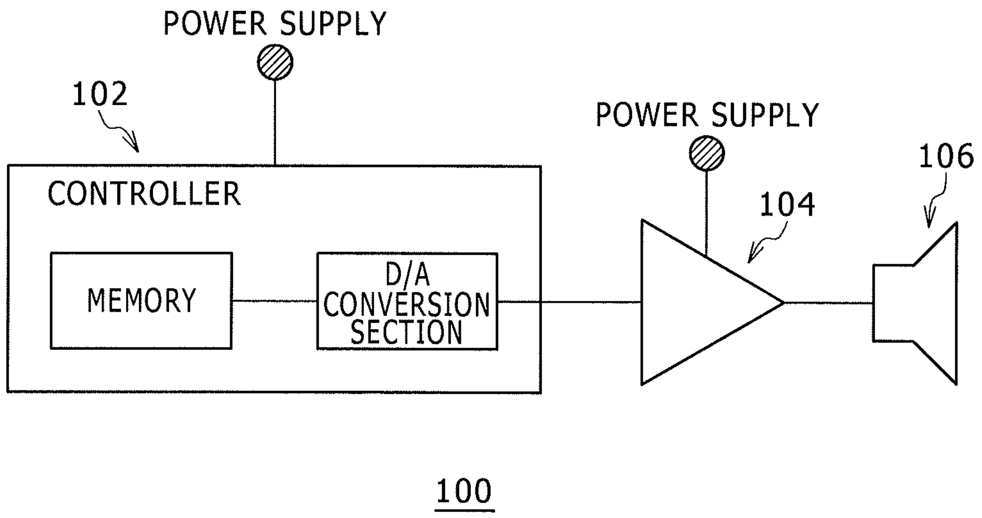
FIG. 1 is a diagram illustrating a configuration example of a film speaker.

FIG. 1 illustrates a configuration example of a speaker using a film material (hereinafter also referred to as a "film speaker"). A film speaker 100 shown in FIG. 1 can be also said to be a speaker set and includes a controller 102, an amplifier 104, and a speaker card 106. The power supply shown in FIG. 1 may be, for example, a rechargeable cell or a dry cell. Alternatively, the power supply may be a generator (e.g., solar generator).

The controller 102 includes a memory and digital/analog conversion section. The memory stores digital audio data. The digital/analog conversion section converts audio data into an analog electric signal (hereinafter also referred to as an "audio signal"). The amplifier 104 amplifies the audio signal output from the controller 102.

The speaker card 106 is a speaker main body using a film material described in Patent Document 1 and Non-Patent Document 1. The speaker card 106 is a highly flexible thin speaker formed in a film shape (in a sheet or card shape in other words). At least part of the speaker card 106 is configured as an oscillator (also referred to as a "diaphragm") that includes a piezoelectric element. The speaker card 106 causes the oscillator to oscillate in accordance with an audio signal output from the amplifier 104, thus producing audio proportional to the audio signal.

In the present specification, the term "audio" includes the term "acoustic" and is not limited, for example, to human voice and broadly includes sounds themselves. For example, the term "audio" includes a sound played by a musical instrument and also includes inaudible sounds such as ultrasonic waves. On the other hand, the term "audio data" is digital data converted (e.g., sampled or coded) from analog audio which is computer-readable and computable.

As a modification example of a configuration of the film speaker 100, the film speaker 100 may include only the speaker card 106. An external device (e.g., amplifier base) may include the functions of the controller 102 and the amplifier 104. In this case, the user may insert the speaker card 106 into the external device for connection so that the speaker card 106 outputs audio based on an audio signal output from the external device.

As another modification example, the film speaker 100 may include the controller 102 and the speaker card 106. An external device (e.g., amplifier base) may include the function of the amplifier 104. In this case, the user may insert the film speaker 100 into the external device for connection so that the film speaker 100 outputs, to the external device, an audio signal based on audio data retained in a built-in memory, acquiring the amplified audio signal from the external device and outputting the audio.

Figure 2:
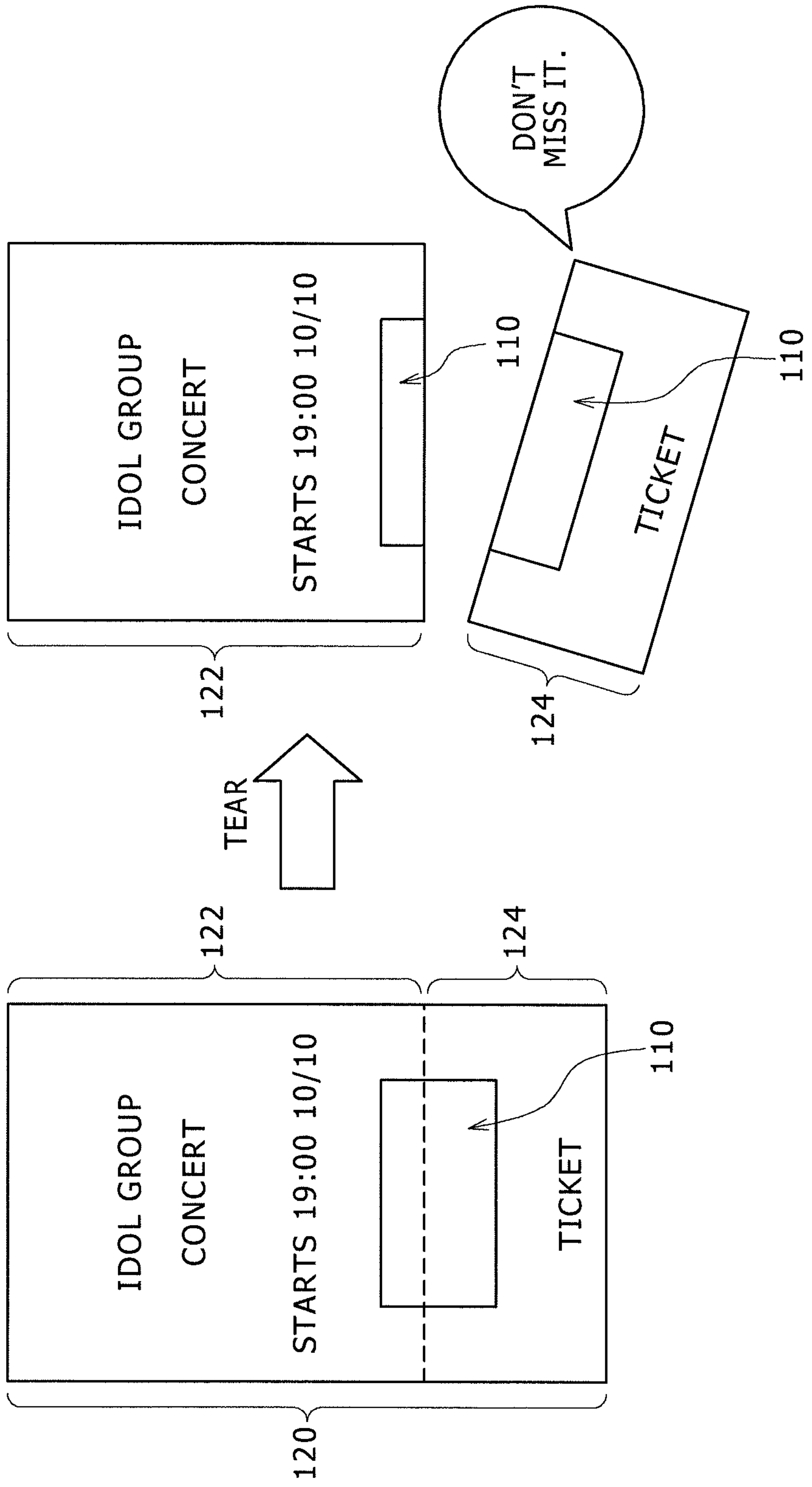
FIG. 2 is a diagram illustrating a usage example of an electroacoustic transducer according to a first embodiment.
Figure 3:
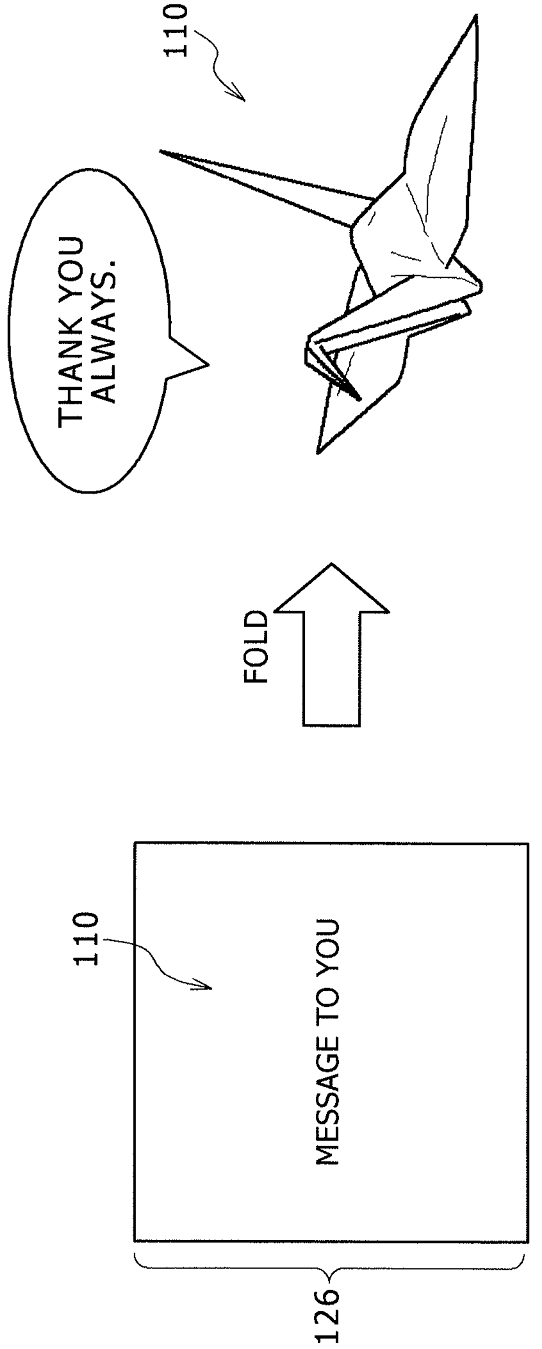
FIG. 3 is a diagram illustrating a usage example of the electroacoustic transducer according to the first embodiment.

An electroacoustic transducer using the film speaker 100 (speaker card 106) shown in FIG. 1 will be proposed below. FIGS. 2 and 3 illustrate usage examples of an electroacoustic transducer 110 according to an embodiment. The electroacoustic transducer 110 is formed in a thin film shape and highly flexible as is the film speaker described in Non-Patent Document 1. The electroacoustic transducer 110 may be formed with a material which is rigid to a certain extent so long as the material changes its appearance (i.e., its apparent shape) as a result of a user's act of tearing or folding.

FIG. 2 illustrates an example of using the electroacoustic transducer 110 for a leaflet (poster) for notifying the public that a concert will be held. A leaflet 120 includes a guidance section 122 and a ticket section 124. The guidance section 122 contains guidance about the concert. The ticket section 124 is an entry ticket to the concert. The electroacoustic transducer 110 is provided to straddle the guidance section 122 and the ticket section 124. The user tears the leaflet 120 (i.e., electroacoustic transducer 110), separating the guidance section 122 from the ticket section 124. The electroacoustic transducer 110 detects the change in its own shape resulting from the tearing of the leaflet 120 by the user, outputting a pre-recorded audio message (e.g., message in the voice of an idol).

FIG. 3 illustrates an example of using the electroacoustic transducer 110 for origami or folding paper. Here, an origami 126 as a whole is formed with the electroacoustic transducer 110. The user folds the origami 126 (i.e., electroacoustic transducer 110) into a given or arbitrary shape (into the shape of a crane in this example). The electroacoustic transducer 110 detects the change in its own shape resulting from the folding of the origami 126 by the user, outputting a pre-recorded audio message (e.g., message from the family).

As described above, the electroacoustic transducer 110 according to the embodiment allows the user to output audio from the electroacoustic transducer 110 by performing an intuitive operation such as tearing or folding the electroacoustic transducer 110 itself. Further, the user can store audio in the electroacoustic transducer 110 by tearing or folding the electroacoustic transducer 110 itself as will be described later. This offers a new form of communication between humans using audio and provides users with an original experience of entertainment using audio.

The electroacoustic transducer 110 will be proposed below which processes audio-related data in accordance with a user's act of "tearing" as a first embodiment. Further, the electroacoustic transducer 110 will be proposed below which processes audio-related data in accordance with a user's act of "folding" as a second embodiment. Still further, a configuration for allowing an external device to detect the change in shape of the electroacoustic transducer 110 will be proposed as a third embodiment.

First Embodiment (Hereinafter Referred to as Such)

As described earlier, the electroacoustic transducer 110 according to the first embodiment is a film speaker which talks when torn. As will be described later, the electroacoustic transducer 110 according to the first embodiment also processes audio when the torn-off piece of the electroacoustic transducer 110 is joined.

Figure 4:
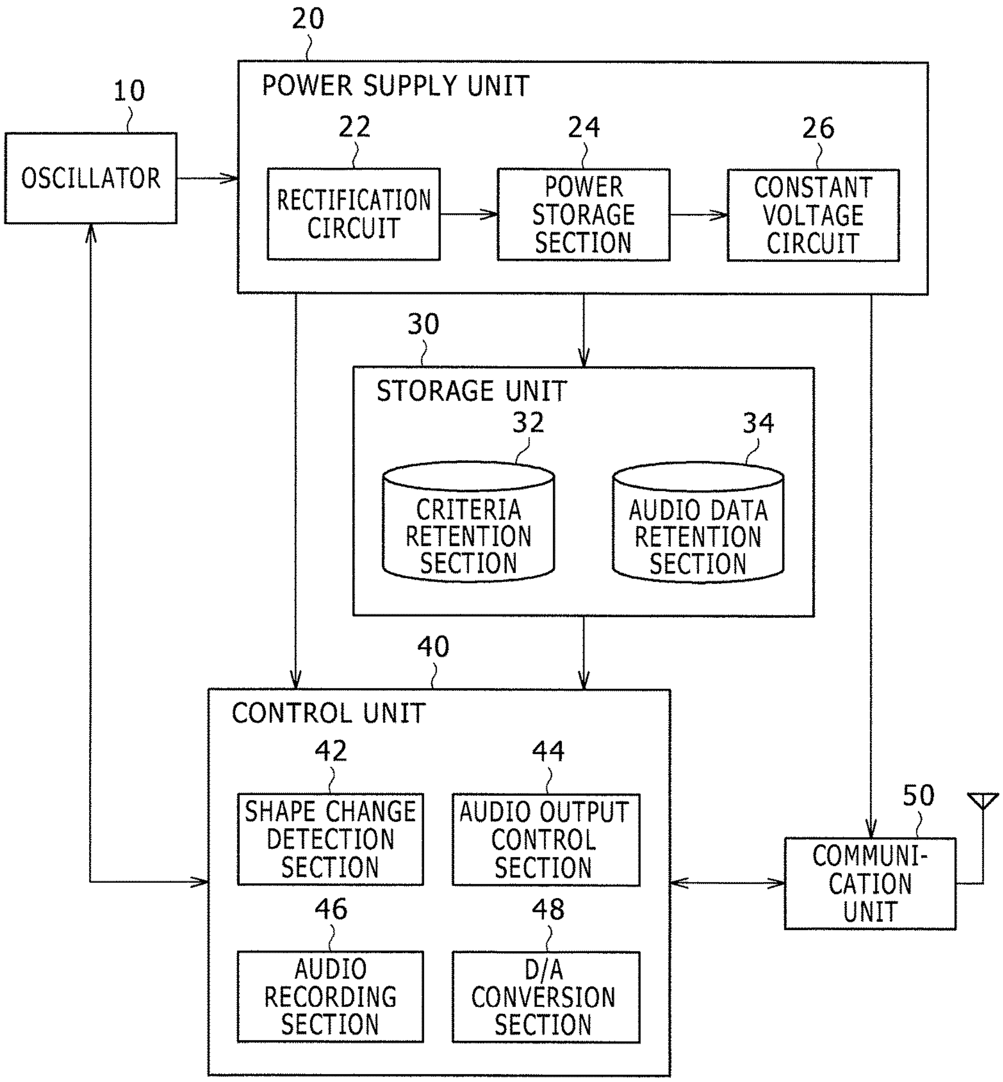
FIG. 4 is a block diagram illustrating a functional configuration of the electroacoustic transducer according to the first embodiment.

FIG. 4 is a block diagram illustrating a functional configuration of the electroacoustic transducer 110 according to the first embodiment. The electroacoustic transducer 110 includes an oscillator 10, a power supply unit 20, a storage unit 30, a control unit 40, and a communication unit 50. Although not illustrated in FIG. 4, the electroacoustic transducer 110 may further include an amplification section adapted to amplify an audio signal. The amplification section may amplify an audio signal to be output to the oscillator 10 or that supplied from the oscillator 10 as necessary.

Each of the blocks shown in the block diagrams of the present specification can be implemented by elements and electronic circuits including computer's central processing unit (CPU) and memory and mechanical devices in terms of hardware and by a computer program, and so on in terms of software. However, functional blocks implemented by coordination therebetween are presented here. Therefore, it is understood by those skilled in the art that these functional blocks can be implemented in various forms by a combination of hardware and software.

Figure 5:
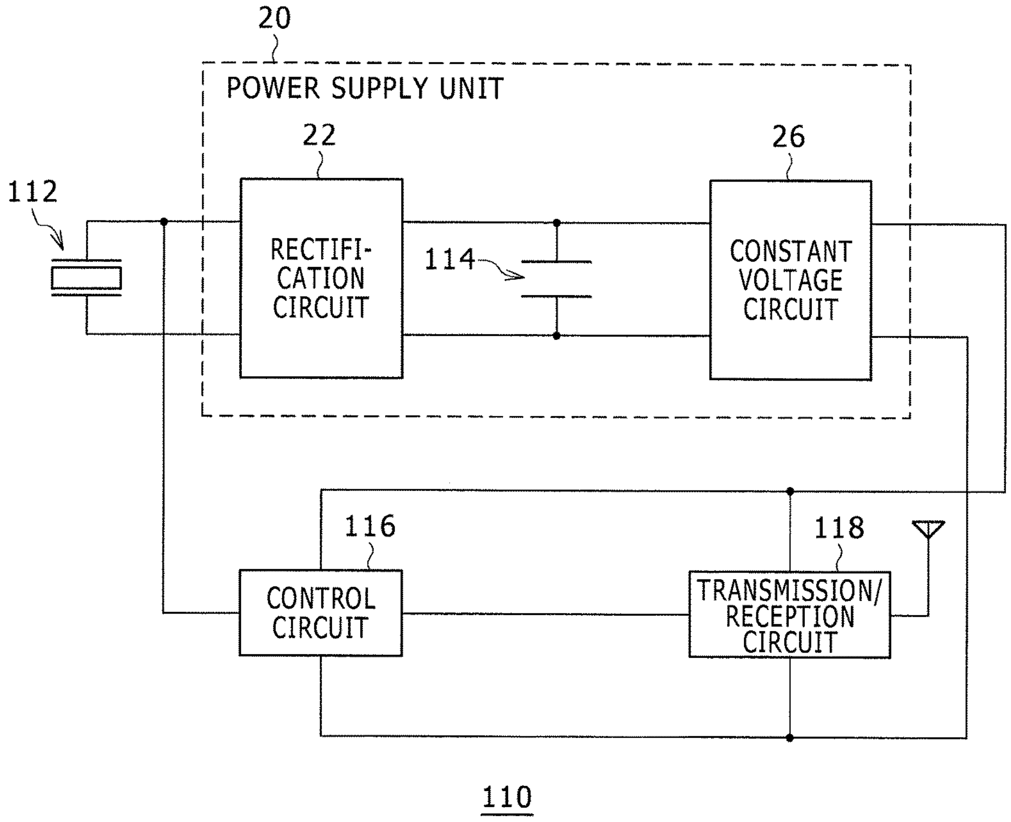
FIG. 5 is a diagram illustrating a hardware configuration example of the electroacoustic transducer.

FIG. 5 illustrates a hardware configuration example of the electroacoustic transducer 110. A piezoelectric element 112 shown in FIG. 5 corresponds to the oscillator 10 shown in FIG. 4. An electric double-layer capacitor 114 shown in FIG. 5 corresponds to a power storage section 24 shown in FIG. 4. A control circuit 116 shown in FIG. 5 corresponds to the control unit 40 shown in FIG. 4. A transmission/reception circuit 118 shown in FIG. 5 corresponds to the communication unit 50 shown in FIG. 4. The storage unit 30 shown in FIG. 4 may be incorporated in the control circuit 116 shown in FIG. 5 as a semiconductor memory.

Referring back to FIG. 4, the oscillator 10 is equivalent to the film speaker described in Non-Patent Document 1 and includes a piezoelectric film (e.g., piezoelectric element or Micro Piezo) that is formed in a thin film shape. The oscillator 10 typically serves as a diaphragm. The oscillator 10 converts an audio signal, supplied from the control unit 40, into physical oscillation. That is, the oscillator 10 oscillates in a manner proportional to the audio signal, thus producing audio represented by the audio signal. Further, the oscillator 10 also serves as a diaphragm of a microphone. That is, the oscillator 10 converts surrounding audio (air oscillation) into an electric signal, outputting an audio signal based on the surrounding audio to the control unit 40.

The oscillator 10 also serves as a power generation section adapted to generate power in accordance with the change in shape. If the user changes the shape of the oscillator 10 by tearing or folding the oscillator 10, a voltage develops which is proportional to the manner in which the shape of the oscillator 10 has been changed (e.g., pressure which caused the change in shape) by piezoelectric effect. The voltage that has developed is supplied to the power supply unit 20 and the control unit 40.

As a modification example, the electroacoustic transducer 110 may include the oscillator 10 and the power generation section separately. In this case, the power generation section may be implemented by a known technology other than piezoelectric element. For example, the power generation section may generate power using heat of its own surface or by ionic concentration difference. Alternatively, the power generation section may generate solar power using, for example, a silicon solar cell or power by oxygen reaction (e.g., dipping the power generation section in juice).

The oscillator 10 is provided on the surface of the electroacoustic transducer 110 that is formed in a film shape, taking up at least part of the surface of the electroacoustic transducer 110. The oscillator 10 may be provided over the entire surface of the electroacoustic transducer 110. The change in shape of the oscillator 10 in the description of the specification can be said to be the change in shape of the electroacoustic transducer 110.

The power supply unit 20 supplies power to the storage unit 30, the control unit 40, and the communication unit 50. The power supply unit 20 includes a rectification circuit 22, the power storage section 24, and a constant voltage circuit 26. The rectification circuit 22 rectifies a voltage that develops in the oscillator 10. The rectification circuit 22 may include diodes and diode bridges.

The power storage section 24 stores direct current (DC) power output from the rectification circuit 22. The power storage section 24 may include, for example, an electric double-layer capacitor, a lithium-ion capacitor, a polyacene-based organic semiconductor capacitor, a nanogate capacitor, a ceramic capacitor, a film capacitor, an aluminum electrolytic capacitor, or a tantalum capacitor.

The constant voltage circuit 26 converts a voltage output from the power storage section 24 into a given voltage, thus stabilizing the output voltage from the power supply unit 20. In the electroacoustic transducer 110, electricity generated by the oscillator 10 is stored, supplying stored electricity to each of the functional blocks as described above. This eliminates the need for a power supply such as cells which would otherwise cause the functional blocks to operate.

It should be noted, however, that the amount of power generated by the oscillator 10 is relatively small. Therefore, the operation time of the control unit 40, for example, may be limited as appropriate. For example, the audio recording and reproducing times of the control unit 40 may be limited to about several to several tens of seconds. As a modification example, the power supply unit 20 may be implemented by an external power supply of the electroacoustic transducer 110 or other known technology such as cells.

The communication unit 50 handles communication with external devices and typically engages in wireless communication. As a wireless communication system, the ANT standard designed for short-range and low power consumption ("ANT" is a trademark or a registered trademark), the Z-Wave standard ("Z-Wave" is a trademark or a registered trademark), the ZigBee standard ("ZigBee" is a trademark or a registered trademark), Bluetooth Low Energy (BLE) ("Bluetooth" is a trademark or a registered trademark), Wifi (trademark or registered trademark), for example, may be used. Alternatively, an appropriate system may be used in accordance with the characteristics of the respective standards.

The external device with which the communication unit 50 communicates may be an information processor provided near the electroacoustic transducer 110. For example, the external device may be a personal computer (PC), a stationary or portable game device, a smartphone, and so on. Further, the external device may, in response to a request to provide audio data from the electroacoustic transducer 110, further download given audio data from an external server via the Internet and transmit the audio data to the electroacoustic transducer 110.

The storage unit 30 provides a storage area for storing a variety of data for the purpose of data processing by the control unit 40. For example, the storage unit 30 may be implemented by a non-volatile semiconductor storage device. The storage unit 30 includes a criteria retention section 32 and an audio data retention section 34. The audio data retention section 34 retains audio data to be reproduced by the electroacoustic transducer 110 (in other words, audio data to be output externally).

The criteria retention section 32 retains reference data for detecting the apparent change in shape of the oscillator 10 due to the tearing of the oscillator 10 by a user (hereinafter also referred to as "shape change detection criteria"). Further, the criteria retention section 32 retains reference data for the electroacoustic transducer 110 to output audio (hereinafter also referred to as an "audio output condition").

The shape change detection criteria are data that define the electrical change that takes place in the oscillator 10 as a result of the change in shape of the oscillator 10. Further, these criteria are data used for comparison against the electrical change of the oscillator 10 actually detected by the control unit 40. The shape change detection criteria may be data that represent voltage waveform patterns that occur as a result of the change in shape of the oscillator 10. Alternatively, these criteria may be data that represent waveform levels or time intervals between waveforms, i.e., a variety of information obtained on the basis of voltage waveforms. On the other hand, if the change in shape is detected using an RFID as will be described later, the shape change detection criteria may be the manner in which a radio frequency (RF) tag adapted to detect the change in shape responds, in other words, data defining a signal reception status from the RF tag.

The shape change detection criteria are data used to detect the change in shape of the oscillator 10 that occurs to an extent perceivable by human eyes. Therefore, it is preferred that information about electrical change in the case of an extremely small oscillation of the oscillator 10 caused by surrounding audio (e.g., human voice) should be excluded from the shape change detection criteria.

The audio output condition may be detection of the apparent change in shape of the oscillator 10 or detection of the tearing of the oscillator 10 by a shape change detection section 42 which will be described later. For example, the audio output condition may be data that define a match between the change in an electric signal output from the oscillator 10 and the shape change detection criterion. Specific examples of the shape change detection criterion and the audio output condition will be described later.

The control unit 40 processes audio-related data. The control unit 40 includes the shape change detection section 42, an audio output control section 44, an audio recording section 46, and a digital-to-analog (D/A) conversion section 48. The D/A conversion section 48 handles digital-to-analog conversion. For example, the D/A conversion section 48 converts digital audio data acquired from the audio data retention section 34 into an analog audio signal. Further, the D/A conversion section 48 converts an audio signal based on surrounding audio supplied from the oscillator 10 into audio data.

The shape change detection section 42 detects the apparent change in shape of the oscillator 10 resulting from a user's act. More specifically, if the user changes the shape of the oscillator 10 by tearing the oscillator 10, the shape change detection section 42 detects this fact on the basis of the electrical change resulting from the act of tearing. Moreover, if the shape change detection section 42 detects the electrical change of the oscillator 10, the shape change detection section 42 compares the detected electrical change against the shape change detection criterion (criterion for detecting tearing). When there is a match between the two, the shape change detection section 42 determines that the oscillator 10 has been torn. Further, the shape change detection section 42 also detects the point of the oscillator 10 where it is torn (hereinafter referred to as a "tearing point") at the same time.

It should be noted that "match," "accord" and other analogous terms in the present specification include perfect agreement, approximate agreement, and similarity. That is, "match," "accord" and other analogous terms in the present specification may tolerate a certain degree of difference in addition to an exact agreement. For example, if the difference between one and the other to be compared falls within a predetermined tolerance range, the two may be considered to "match" or be in "accord" with each other. As this tolerance range, an appropriate value may be determined, for example, on the basis of experience and knowledge of the developer of the electroacoustic transducer 110 or experimentally using the electroacoustic transducer 110.

Further, if the change in shape of the oscillator 10 occurs as a result of the user joining the two or more oscillators 10 together, the shape change detection section 42 detects this fact on the basis of the electrical change resulting from the act of joining. If the shape change detection section 42 detects the electrical change of the oscillator 10, the shape change detection section 42 compares the detected electrical change against the shape change detection criterion (criterion for detecting junction). When the two match, the shape change detection section 42 determines that the oscillator 10 has been joined to the other oscillator 10. It should be noted that "junction" can also be said to be "union."

If the audio output condition of the criteria retention section 32 is satisfied, the audio output control section 44 decodes audio data stored in the audio data retention section 34, outputting the decoded audio signal to the oscillator 10. This allows audio based on the audio data to be output via the oscillator 10. The detection of the change in shape of the oscillator 10 (e.g., tearing) may be specified as an audio output condition. In this case, the audio output control section 44 may immediately output audio if the change in shape of the oscillator 10 (e.g., tearing) is detected by the shape change detection section 42.

The audio recording section 46 encodes an audio signal supplied from the oscillator 10, storing the encoded audio data in the audio data retention section 34. Further, the audio recording section 46 acquires audio data received by the communication unit 50, storing the audio data in the audio data retention section 34.

A detailed description will be given next of how the tearing of the oscillator 10 and the tearing point are detected. Although the following lists five methods to do so, other known method may be used instead. Alternatively, a plurality of detection methods may be used in combination as appropriate.

Method 1: Using RFID

Figure 6A:
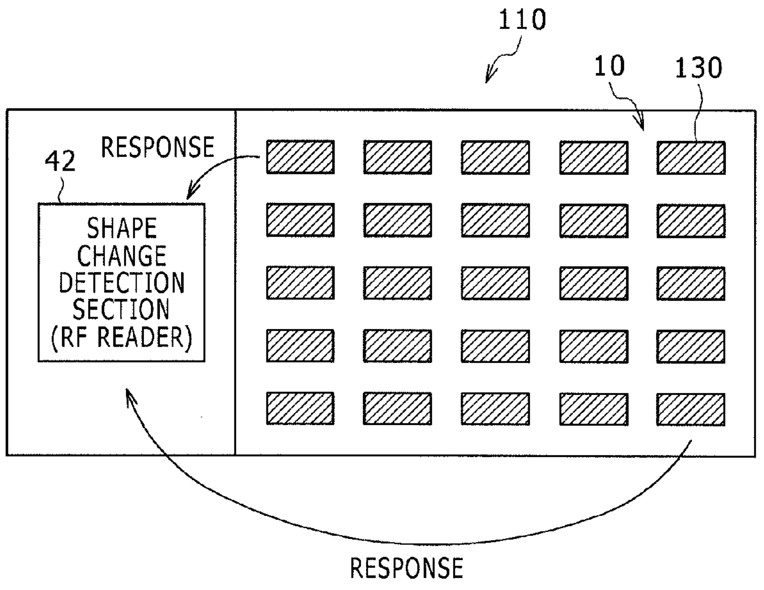
FIGS. 6A and 6B are conceptual diagrams of a shape change detection method using a radio frequency identifier (RFID)
Figure 6B:
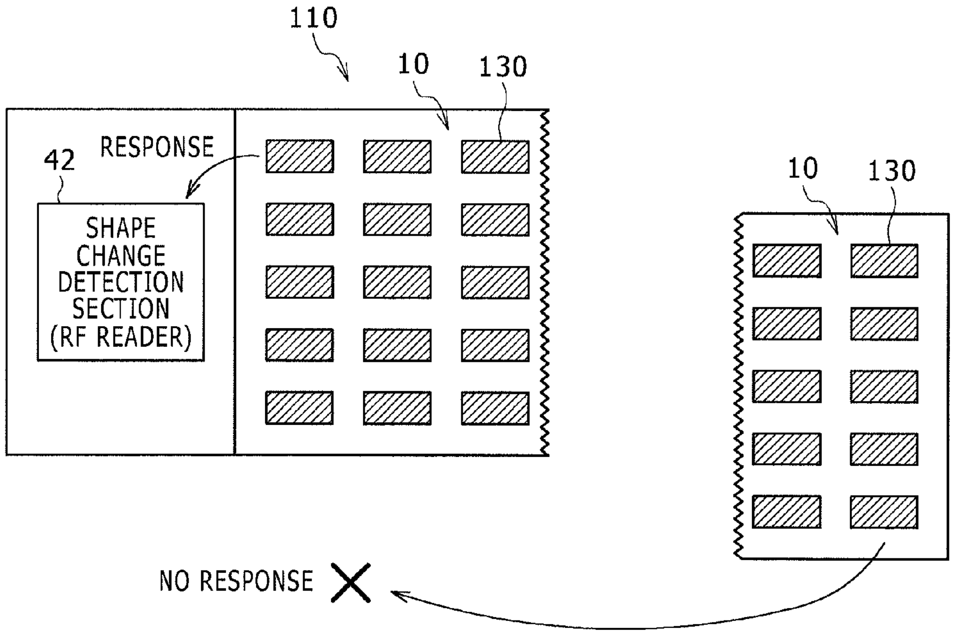

FIGS. 6A and 6B are conceptual diagrams of a shape change detection method using REID. In this example, a plurality of RF tags 130 are arranged on the oscillator 10. The shape change detection section 42 includes an RF reader and transmits a response request to each of the RF tags 130 at regular intervals (e.g., every 300 milliseconds). FIG. 6A illustrates the initial condition of the oscillator 10, i.e., a condition thereof before the oscillator 10 is torn by the user. The shape change detection section 42 receives response signals from all the RF tags 130. Therefore, the shape change detection section 42 does not detect the tearing of the oscillator 10. In other words, the shape change detection section 42 determines that the oscillator 10 has yet to be torn. A response signal from each of the RF tags 130 can also be said to be a keep-alive signal.

FIG. 6B illustrates the condition of the oscillator 10 after it has been torn by the user. When the user tears the oscillator 10, the shape change detection section 42 no longer receives response signals from the RF tags 130 arranged on the oscillator 10 that has been separated from the electroacoustic transducer 110. If the shape change detection section 42 no longer receives response signals from at least some of the plurality of RF tags 130, the shape change detection section 42 determines that the shape change detection criteria have been satisfied, detecting the tearing of the oscillator 10.

Communication between the RF reader (shape change detection section 42) and the RF tags 130 may be achieved by known short-range wireless communication such as near field communication (NFC). The possible communication range may be 10 centimeters or so. Further, although an example of wireless communication is shown in FIGS. 6A and 6B, tearing can be detected similarly in the case of wired communication because communication lines are cut off.

Further, although a number of RF tags 130 are arranged over the entire surface of the oscillator 10 in FIGS. 6A and 6B, the arrangement of the RF tags 130 is not limited thereto. If the point of the oscillator 10 to be torn by the user is determined in advance, whether the oscillator 10 has been torn may be determined in accordance with whether a response signal is received from the single RF tag 130 arranged in the area to be torn and separated. For example, if the point where the ticket is to be cut off is determined in advance as illustrated in FIG. 2, the shape change detection section 42 may be provided in the ticket section 124, with the single RF tag 130 provided in the guidance section 122.

Further, the storage unit 30 may store tag information that associates identification (ID) information of each of the plurality of RF tags 130 and position information of each of the RF tags 130 arranged on the oscillator 10. A response from each of the RF tags 130 may include ID information of each of the RF tags 130. The shape change detection section 42 may detect the IDs of the RF tags 130 included in the received response signals, thus detecting the IDs of the RF tags 130 whose response signals have yet to be received for a given period of time (e.g., 1 second) or more (hereinafter referred to as "no-response tags"). The shape change detection section 42 may identify the positions of the no-response tags by referring to tag information, thus determining that the area of the oscillator 10 that includes the no-response tags has been torn off. This allows the shape change detection section 42 to identify the tearing point of the oscillator 10 (area where the oscillator 10 has been torn).

Method 2: Measuring Electric Resistance

Conductive carbon is applied to the surface of the oscillator 10. The criteria retention section 32 retains, as a shape change detection criterion, an electric resistance of the oscillator 10 or an electric resistance variation pattern thereof (in other words, "progression pattern") when the oscillator 10 is torn. The shape change detection section 42 constantly or regularly measures the electric resistance of the oscillator 10. The shape change detection section 42 detects the tearing of the oscillator 10 if the electric resistance of the oscillator 10 or the variation pattern of the electric resistance thereof matches the shape change detection criterion.

Method 3: Measuring Electromotive Force

The shape change detection section 42 detects the tearing of the oscillator 10 on the basis of the pattern of power produced by piezoelectric effect resulting from the tearing of the oscillator 10. More specifically, the shape change detection section 42 measures the voltage output from the oscillator 10, generating a voltage waveform pattern representing the progression of the voltage thereof (hereinafter referred to as "power generation information"). The criteria retention section 32 retains, as shape change detection criteria, a voltage waveform pattern output from the oscillator 10 when the oscillator 10 is torn. The shape change detection section 42 detects the tearing of the oscillator 10 when the generated power generation information matches the shape change detection criterion. It should be noted that the generated power generation information and the shape change detection criterion may be data representing waveform levels or time intervals between waveforms, i.e., a variety of information obtained on the basis of voltage waveforms.

Further, as the shape change detection criteria of the criteria retention section 32, a plurality of waveform patterns, which are experimentally determined in advance, for the tearing of various points (areas) of the oscillator 10 may be retained. More specifically, a plurality of waveform patterns may be retained in association with identification information of a plurality of tearing points. The shape change detection section 42 identifies the waveform pattern that matches the power generation information from among a plurality of waveform patterns, i.e., shape change detection criteria, thus identifying the tearing point associated with the identified waveform pattern. This allows the shape change detection section 42 to identify the tearing point (torn area) of the oscillator 10.

Method 4: Measuring the Amount of Power Generated

If the power generation section of the electroacoustic transducer 110 generates solar power, the shape change detection section 42 measures the amount of power generated (e.g., voltage or current) by the power generation section. The criteria retention section 32 retains, as shape change detection criteria, an amount of power generated by the power generation section or a progression pattern of amount of power generated. The shape change detection section 42 detects the tearing of the oscillator 10 if the amount of power generated by the power generation section or the progression pattern thereof matches the shape change detection criterion.

Method 5: Checking for Continuity

Figure 7:
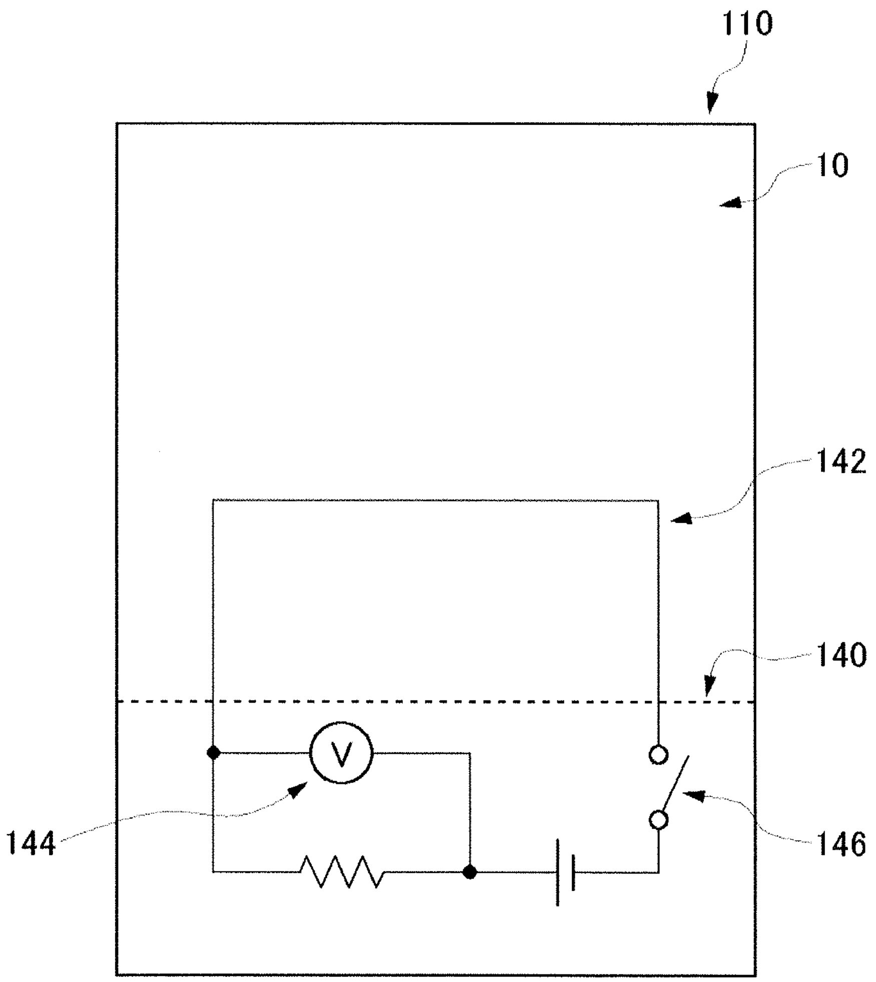
FIG. 7 is a diagram illustrating a circuit configuration for shape change detection.

FIG. 7 is a diagram illustrating a circuit configuration for shape change detection. Here, a cutting point 140 of the oscillator 10 of the electroacoustic transducer 110 is determined in advance. A conductor (wire) is arranged inside the oscillator 10, thus forming a circuit 142 in such a manner as to straddle the cutting point 140. In other words, the circuit 142 is formed to spread across a plurality of areas separated by a user's act of tearing. The shape change detection section 42 checks for continuity on the basis of voltage information measured by a voltmeter 144. Then, if there is no continuity, the shape change detection section 42 determines that the shape change detection criterion is satisfied, detecting the tearing of the oscillator 10. A switch 146 may be turned ON at predetermined times (e.g., every 300 milliseconds) or remain ON at all times.

Alternatively, a plurality of conductors may be arranged inside the oscillator 10 in a grid pattern, thus forming a plurality of circuits, each with one of the conductors. The shape change detection section 42 checks for continuity in each circuit. If lack of continuity is detected in a circuit, the shape change detection section 42 detects the disconnection of the conductor used in the circuit, thus detecting the tearing of the oscillator 10. Still alternatively, the storage unit 30 may retain identification information of each conductor in association with where each conductor is arranged on the oscillator 10. The shape change detection section 42 may identify the tearing point on the basis of where the cut conductor is arranged. This allows the shape change detection section 42 to identify the tearing point (torn area) of the oscillator 10.

A detailed description will be given next of the detection method of the fact that the plurality of oscillators 10 are joined (united) together. Although the following lists two methods to do so, other known method may be used instead. Alternatively, a plurality of detection methods may be used in combination as appropriate.

Method 1: Using RFID

As illustrated in FIGS. 6A and 6B, the plurality of RF tags 130 are arranged on the oscillator 10. The storage unit 30 retains ID information of the RF tags 130 arranged on the oscillator 10 to be joined in advance. The shape change detection section 42 identifies the IDs of the RF tags included in the received response signals. If the identified IDs match those of the RF tags 130 arranged on the oscillator 10 to be joined, the shape change detection section 42 determines that the shape change detection criterion is satisfied, detecting the joining of the plurality of oscillators 10.

Alternatively, the storage unit 30 may retain ID information of all the RF tags 130 arranged on the oscillator 10 before cutting as illustrated in FIG. 6A. If this oscillator 10 is torn into two pieces as illustrated in FIG. 6B which are joined back together afterwards in the manner shown in FIG. 6A, the shape change detection section 42 may determine that the shape change detection criterion is satisfied when response signals representing all the IDs stored in the storage unit 30 are received, thus determining that the oscillators 10 that were separated once are joined back together again. This allows the shape change detection section 42 to detect the tearing of the originally single oscillator 10 and the joining of the torn-off pieces of the oscillator 10 back together.

It should be noted that if only the joining is detected, the joining of the plurality of oscillators 10 may be detected when the number of response signals received, in other words, the number of IDs of the RF tags 130 identified by the received response signals, increases more than that when just preceding confirmation was made. For example, this case corresponds to a case in which the number of received response signals increases from 0 to 1. In this case, only the single RF tag 130 may be arranged on the oscillator 10 to be joined to the electroacoustic transducer 110 (oscillator 10) having the shape change detection section 42.

Method 2: Checking for Continuity

If the cutting point 140 of the oscillator 10 of the electroacoustic transducer 110 is determined in advance as illustrated in FIG. 7, the circuit 142 is arranged inside the oscillator 10 in such a manner as to straddle the cutting point 140. The shape change detection section 42 checks for continuity on the basis of voltage information measured by the voltmeter 144. If a change occurs from absence to presence of continuity, the shape change detection section 42 determines that the shape change detection criterion is satisfied, detecting the joining of the plurality of oscillators 10.

As an alternative method, the criteria retention section 32 may retain, as a shape change detection criterion, an electric resistance or an amount of power generated when the plurality of oscillators 10 are joined together. The shape change detection section 42 may compare the electric resistance or the amount of power generated actually measured on the oscillator 10 against the shape change detection criterion, determining that the plurality of oscillators 10 are joined together when there is a match between the two.

A description will be given below of the operation of the electroacoustic transducer 110 according to the first embodiment configured as described above. We assume here that the entire surface of the electroacoustic transducer 110 is configured as the oscillator 10 (i.e., film speaker). The change in shape of the oscillator 10 can be interpreted as the change in shape of the electroacoustic transducer 110 (i.e., film speaker).

Figure 8:
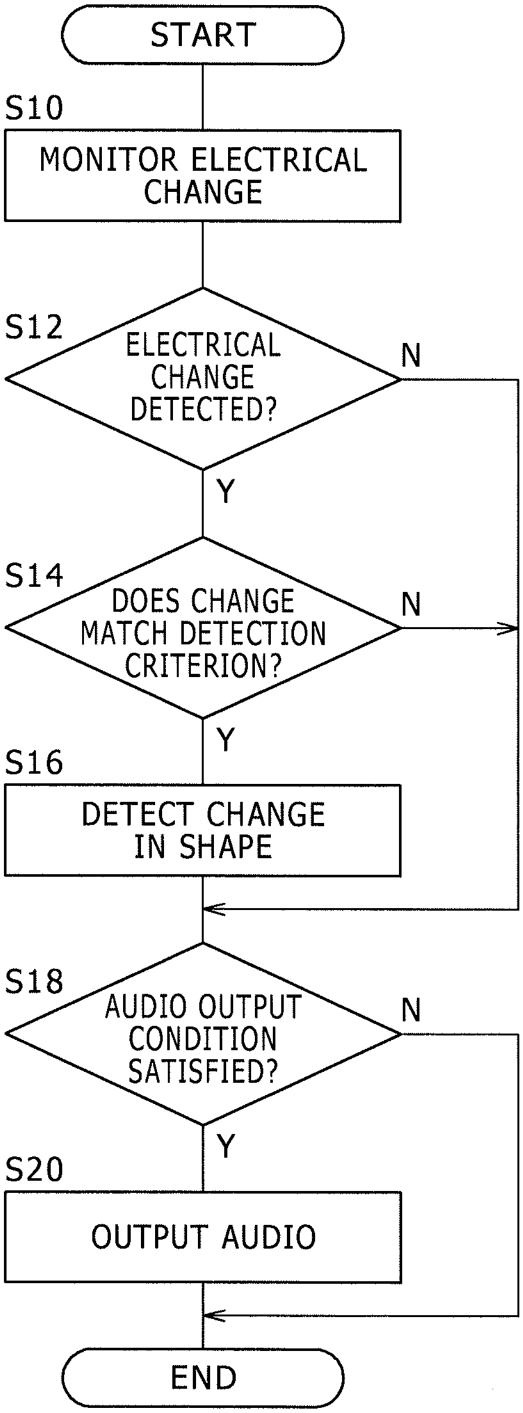
FIG. 8 is a flowchart illustrating a first operation example of the electroacoustic transducer.

FIG. 8 is a flowchart illustrating a first operation example of the electroacoustic transducer 110. The shape change detection section 42 monitors the electrical change in a given monitored item of the oscillator 10 (S10). A monitored item is an information item defined by a shape change detection criterion and may be at least one of the following, namely, the change in reception condition of response signals (FIGS. 6A and 6B), the change in electric resistance, the change in electromotive force, the change in amount of power generated, and the change in continuity condition. The electrical change occurs in the oscillator 10 when the user tears the oscillator 10.

The shape change detection section 42 detects the electrical change in the monitored item (Y in S12), detecting the change in shape of the oscillator 10 (S16) if the electrical change is in accord with the shape change detection criterion (Y in S14). In the first embodiment, the tearing of the oscillator 10 is detected. The shape change detection section 42 conveys information representing this fact to the audio output control section 44. If no electrical change in the monitored item is detected (N in S12) or if there is a mismatch between the detected electrical change and the shape change detection criterion (N in S14), S16 is skipped.

When the audio output condition is satisfied (Y in S18), the audio output control section 44 outputs, via the oscillator 10, audio based on audio data stored in advance in the audio data retention section 34 (S20). For example, the audio output control section 44 may hand over digital audio data to the D/A conversion section 48 for conversion to an analog audio signal, producing audio by outputting the audio signal to the oscillator 10 and causing the oscillator 10 to oscillate. If the audio output condition is not satisfied (N in S18), S20 is skipped to terminate the procedure shown in FIG. 8.

The electroacoustic transducer 110 regularly repeats the operation in the flowchart shown in FIG. 8 and in the subsequent flowcharts, repeating the operation every given period of time (e.g., 300 milliseconds). It should be noted, however, that if the electroacoustic transducer 110 outputs audio in S20 a given number of times (e.g., once), the repetition of the operation shown in the flowcharts may be stopped. Further, the determination as to whether the shape change detection criterion is satisfied (e.g., S12 and S14) and that as to whether the audio output condition is satisfied (e.g., S18) may be performed concurrently.

The audio output condition may be the detection of the tearing of the oscillator 10 by the shape change detection section 42. That is, the audio output control section 44 may output audio upon detection of the tearing of the oscillator 10. This is the same as skipping the determination in S18 and proceeding to S20. Among possible products using the electroacoustic transducer 110 of the present mode are leaflet, advertisement, and poster which talk when torn as illustrated in FIG. 2. Among other possible products are wrapping paper that outputs a given audio message about a sell-by date and so on when torn and seal that outputs a warning audio message when torn.

Alternatively, the audio output condition may be connection to the amplifier. In this case, when the user tears the electroacoustic transducer 110 and connects the torn-off piece to the amplifier, audio is output. For example, the audio output control section 44 may detect the connection of the electroacoustic transducer 110 to the amplifier on the basis of a given signal supplied from the amplifier when the torn-off piece is connected to the amplifier so as to output audio at the time of the detection.

Further, the audio data retention section 34 may store a plurality of types of audio data. The criteria retention section 32 may store, as the audio output condition, each of "possible tearing points" in association with information representing the type of audio data to be output. Each of possible tearing points is information representing the point or area of the oscillator 10 where the oscillator 10 is likely to be torn. The shape change detection section 42 may detect the tearing point of the oscillator 10. The audio output control section 44 may reproduce the audio data associated with the possible tearing point that matches the detected tearing point. The present mode provides the electroacoustic transducer 110 that permits, for example, different numbers to be reproduced depending on where the oscillator 10 is torn. It should be noted that the number of tearing points can be restricted by determining, in advance, tearing points of the oscillator 10, i.e., the points of the oscillator 10 to be torn by the user.

Incidentally, if the tearing point is different, the shape of the oscillator 10 resulting from the tearing will also be different. Therefore, changing the audio to be output in accordance with the tearing point can also be said to be changing the audio to be output in accordance with the shape of the oscillator 10 resulting from the tearing. That is, the audio output control section 44 may output first audio when the oscillator 10 changes into a first shape, and second audio when the oscillator 10 changes into a second shape, as a result of the tearing of the oscillator 10.

Further, the shape change detection criterion may be a criterion for detecting the joining of the plurality of oscillators 10. For example, the shape change detection criterion may define the electrical change pattern resulting from joining of the plurality of oscillators 10. The audio output condition may be detection of joining of the plurality of oscillators 10. In this case, the audio output control section 44 may reproduce audio data immediately when the plurality of oscillators 10 are joined together. The electroacoustic transducer 110 in the present mode is designed to output audio when the user joins together the separate pieces (electroacoustic transducer 110), making the electroacoustic transducer 110 applicable to a variety of toys and communication tools.

Alternatively, the audio output condition may be elapse of a given period of time from the detection of the change in shape. In this case, the audio output control section 44 may start measuring time with a timer when the change in shape is detected by the shape change detection section 42. The audio output control section 44 may reproduce audio data when the elapsed time from the detection of the change in shape by the shape change detection section 42 matches the time defined by the audio output condition. The present mode provides, for example, a memo pad or Post-it note that outputs an audio message when a given period of time such as three minutes or one hour elapses after the pad or note is removed from the sticker sheet. The present mode can also be used effectively in combination with the configuration for recording surrounding audio at the time of the change in shape which will be described later.

Figure 9:
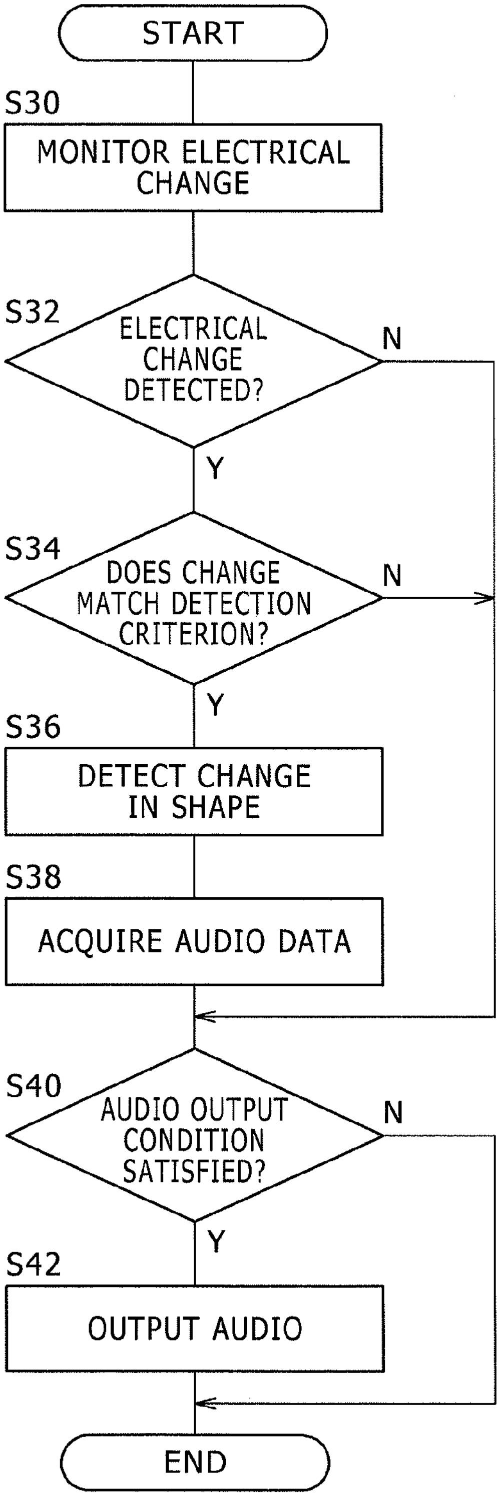
FIG. 9 is a flowchart illustrating a second operation example of the electroacoustic transducer.

FIG. 9 is a flowchart illustrating a second operation example of the electroacoustic transducer 110. The steps from S30 to S36 and S40 to S42 in FIG. 9 are identical to those from S10 to S16 and S18 to S20 in FIG. 8. Therefore, the description thereof is omitted. When the shape change detection section 42 detects the tearing of the oscillator 10 in S36, the shape change detection section 42 notifies the audio recording section 46 of this effect. The audio recording section 46 transmits a request to provide audio data to the information processor nearby. Then, the audio recording section 46 acquires audio data from the information processor and stores the data in the audio data retention section 34 (S38). It should be noted that if the answer is No (N) in S32 or S34, S36 and S38 are skipped.

In the second operation example shown in FIG. 9, the electroacoustic transducer 110 acquires audio data to be reproduced from an external device at the time of the detection of the change in shape. This makes it possible to readily change or update the content of audio to be output from the electroacoustic transducer 110 by changing or updating audio data (e.g., audio data retained by the external device) provided by the external device as necessary. For example, it is possible to output, from the electroacoustic transducer 110, suitable audio tailored to circumstances in which the electroacoustic transducer 110 is torn, to social trends, or to business convenience.

The shape change detection criterion may be the tearing of the oscillator 10 at a first point, and the audio output condition may be the tearing of the oscillator 10 at a second point different from the first point. In this case, when the shape change detection section 42 detects the tearing of the oscillator 10 at the first point, the audio recording section 46 acquires and records audio data. Then, when the shape change detection section 42 detects the tearing of the oscillator 10 at the second point, the audio output control section 44 reproduces and outputs the audio data acquired previously. The user can control audio processing of the electroacoustic transducer 110 in accordance with the tearing point of the oscillator 10.

Further, in S38 shown in FIG. 9, surrounding audio may be recorded rather than acquiring audio data from an external device. More specifically, the oscillator 10 may output an audio signal representing surrounding audio to the control unit 40. The D/A conversion section 48 may generate audio data by encoding the supplied audio signal, and the audio recording section 46 may store the generated audio data in the audio data retention section 34. The present mode allows for surrounding audio at the time of tearing of the oscillator 10 to be recorded, thus reproducing the audio when the audio output condition is satisfied.

Alternatively, if the oscillator 10 is torn at the first point, this may be considered as satisfaction of the shape change detection criterion, thus recording surrounding audio (message generated by the user who tore the oscillator 10 here). Still alternatively, if the oscillator 10 is torn at the second point, this may be considered as satisfaction of the audio output condition, thus outputting pre-recorded audio from the oscillator 10. The present mode provides a type of communication that allows user A to store an audio message by tearing off part of the electroacoustic transducer 110 serving as a message card and user B to listen to the audio message by tearing off part of the electroacoustic transducer 110.

As a modification example of the message card, the audio output condition may be a criterion for detecting the joining of the plurality of oscillators 10. For example, this condition may define the electrical change pattern as a result of the joining of the plurality of oscillators 10. The audio output control section 44 reproduces audio data when the shape change detection section 42 detects the joining of the plurality of oscillators 10.

The present mode provides a type of communication that allows pre-recorded audio to be reproduced by tearing the originally single oscillator 10 and recording surrounding audio or audio provided by an external device first and then joining together the torn-off pieces of the oscillator 10. The joining can be detected only when the original pieces are joined together, and not when false pieces are joined together. This makes it possible to use the electroacoustic transducer 110 as a password among those each of whom has one of the original pieces, in other words, a jargon among a plurality of people.

Second Embodiment (Hereinafter Referred to as Such)

The electroacoustic transducer 110 according to a second embodiment is a film speaker which talks when folded. In the second embodiment, a user's act of "folding" includes a variety of acts related to changing the shape of the oscillator 10 and folding it. For example, a user's act of folding includes an act of extending the originally folded oscillator 10 and rounding the oscillator 10.

The electroacoustic transducer 110 according to the second embodiment is identical in functional configuration to that according to the first embodiment shown in FIG. 4. A description will be omitted as appropriate to avoid redundancy. The criteria retention section 32 retains shape change detection criteria for detecting the apparent change in shape of the oscillator as a result of the folding of the oscillator 10 by the user. Further, the criteria retention section 32 retains an audio output condition as in the first embodiment.

If the oscillator 10 changes its shape as a result of the user folding the oscillator 10, the shape change detection section 42 detects this fact on the basis of the electrical change that occurs as a result of an act of folding. Moreover, if the shape change detection section 42 detects the electrical change of the oscillator 10, the shape change detection section 42 compares the detected electrical change against the shape change detection criterion, thus detecting the folding of the oscillator 10. Further, the shape change detection section 42 also detects the point of the oscillator 10 where it is folded (hereinafter referred to as a "folding point") at the same time.

A detailed description will be given next of how the folding of the oscillator 10 and the folding point are detected. Although the following lists four methods to do so, other known method may be used instead. Alternatively, a plurality of detection methods may be used in combination as appropriate.

Method 1: Using Matrix Switches

Figure 10:
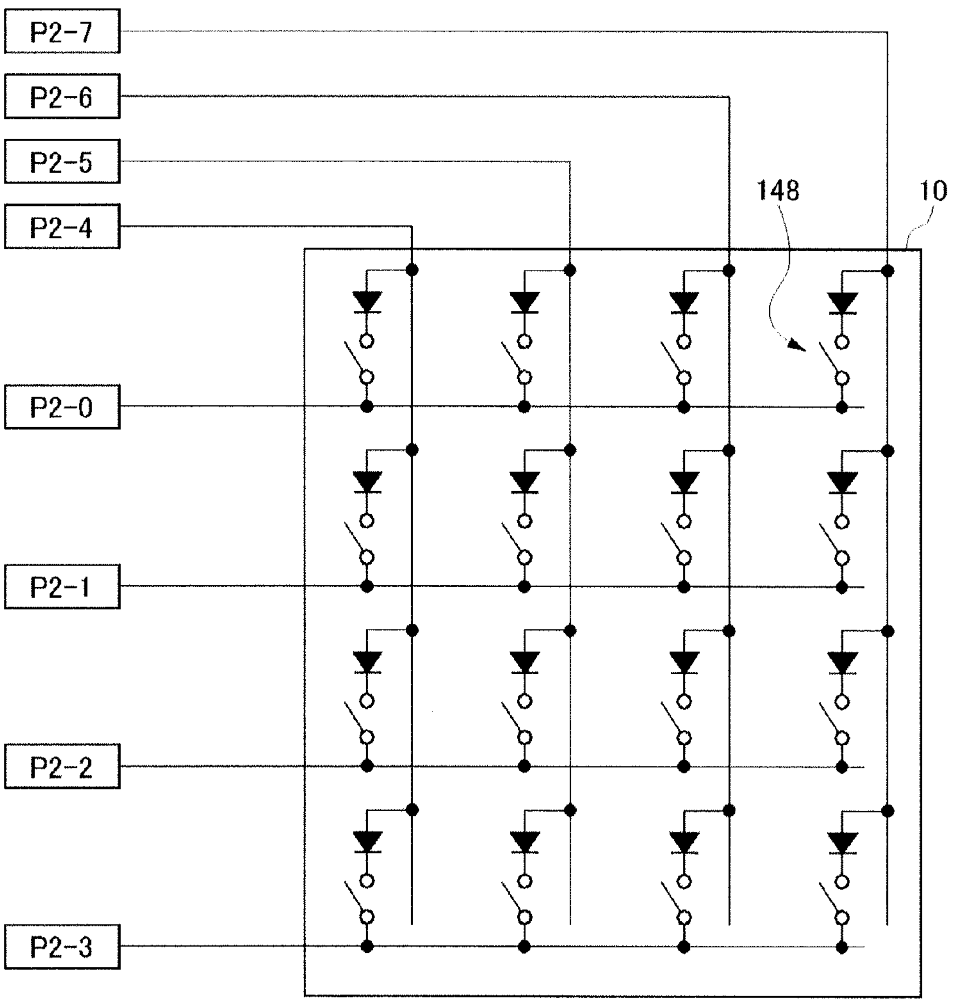
FIG. 10 is a circuit diagram including a matrix switch.

FIG. 10 is a circuit diagram including matrix switches. P2-0 to P2-7 are pin numbers of port 2 of the shape change detection section 42 (control unit 40). A plurality of switches are provided on the oscillator 10. Each of these switches turns ON when the oscillator 10 is folded where it is arranged. In the example shown in FIG. 10, pins P2-0 to P2-3 are outputs, and pins P2-4 to P2-7 are inputs. Each input pin turns ON a built-in pull-up resistor.

With the pin P2-0 at low level and the pins P2-1 to P2-3 at high level, the states of the pins P2-4 to P2-7 are read. A switch 148 arranged at the folding point turns ON. Therefore, the associated pin goes down to low level. The switches arranged at locations other than the folding point turn OFF. Therefore, the associated pins go up to high level because of pull-up resistors. The line to be pulled down to low level is switched in sequence from the pin P2-0 to the pin P2-3, and the states of the pins P2-4 to P2-7 are read in synchronism therewith, thus acquiring the state of each switch.

If the shape change detection section 42 detects a switch that is ON, the shape change detection section 42 considers this detection as satisfaction of the shape change detection criterion, thus detecting the folding of the oscillator 10. Further, the shape change detection section 42 may store, in advance, where each of the switches 148 is arranged on the oscillator 10. The shape change detection section 42 may identify where the one or more switches that are ON are arranged, thus identifying, as a folding point, an area obtained by connecting the points where the switches are arranged.

Figure 11:
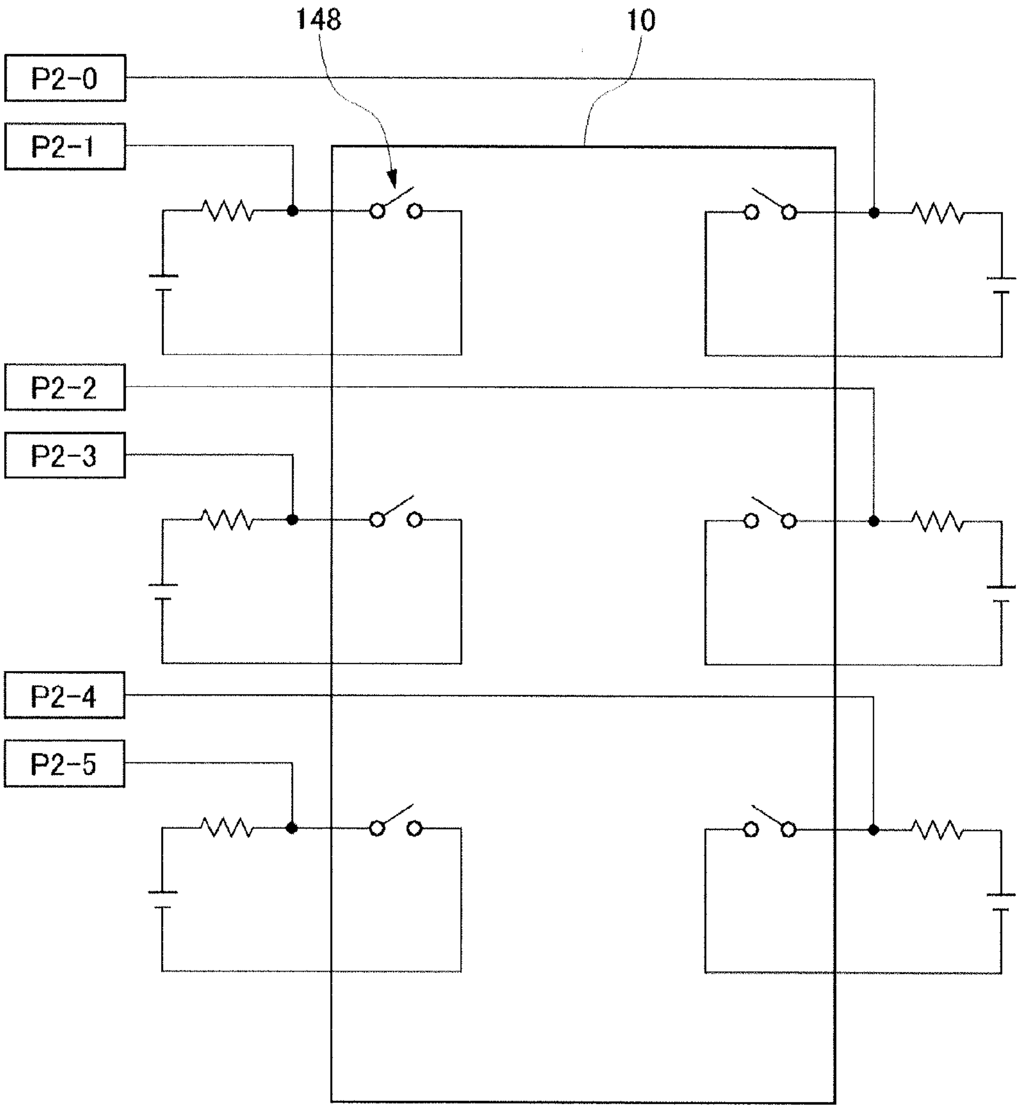
FIG. 11 is a diagram illustrating a circuit configuration to replace that shown in FIG. 10.

It should be noted that if the shape change detection section 42 (control unit 40) has a sufficient number of input ports, each of circuits including a plurality of switches may be connected to one of the input ports of the shape change detection section 42 (control unit 40) as illustrated in the circuit configuration of FIG. 11.

Method 2: Checking for Continuity

The electrode of each of the plurality of circuits shown in FIG. 11 may short out or lose continuity if the oscillator 10 is folded. If the shape change detection section 42 detects shorting or loss of continuity of the electrodes of the plurality of circuits arranged on the oscillator 10, the shape change detection section 42 detects the folding of the oscillator 10. Further, the shape change detection section 42 may identify the folding point by identifying where the circuit whose electrode has shorted out or lost continuity is arranged.

Method 3: Measuring Electric Resistance

Conductive carbon is applied to the surface of the oscillator 10. The criteria retention section 32 retains, as a shape change detection criterion, an electric resistance of the oscillator 10 or an electric resistance variation pattern thereof (in other words, "progression pattern") when the oscillator 10 is folded. The shape change detection section 42 constantly or regularly measures the electric resistance of the oscillator 10. The shape change detection section 42 detects the folding of the oscillator 10 if the electric resistance of the oscillator 10 or the variation pattern of the electric resistance thereof matches the shape change detection criterion.

A plurality of conductors (wires) made of a specific material (e.g., carbon powder) may be arranged inside the oscillator 10 in such a manner that the electric resistance of the oscillator 10 changes when the oscillator 10 is folded. The criteria retention section 32 retains, as a shape change detection criterion, an electric resistance variation pattern of the conductors resulting from the folding of the conductors. The shape change detection section 42 constantly or regularly measures the electric resistance of each of the conductors. The shape change detection section 42 detects the folding of the oscillator 10 if the variation pattern of the electric resistance of any of the conductors matches the shape change detection criterion.

Each of the conductors may be connected to a different input port/pin of the shape change detection section 42 (control unit 40). The shape change detection section 42 may store, in advance, where each conductor is arranged inside the oscillator 10. The shape change detection section 42 may identify, of a plurality of conductors, a conductor whose electric resistance has changed and identify where each of the conductors whose electric resistance has changed is arranged, thus identifying the folding point on the basis of where the folded conductors are arranged.

Method 4: Measuring Electromotive Force

The shape change detection section 42 detects the folding of the oscillator 10 on the basis of the pattern of power generated by piezoelectric effect resulting from the folding of the oscillator 10 as in the first embodiment.

Further, the criteria retention section 32 may retain, as shape change detection criteria, a plurality of waveform patterns for the folding of various points (areas) of the oscillator 10. These patterns are determined, for example, experimentally in advance. More specifically, the criteria retention section 32 may retain a plurality of waveform patterns in association with identification information of a plurality of folding points. The shape change detection section 42 identifies the waveform pattern that matches the power generation information of the oscillator 10 from among a plurality of waveform patterns, i.e., shape change detection criteria, thus identifying the folding point associated with the identified waveform pattern. This allows the shape change detection section 42 to identify the folding point or area of the oscillator 10.

The shape change detection section 42 may identify the shape of the oscillator 10 resulting from the folding on the basis of the number of times the oscillator 10 has been folded or the folding point that is detected as described above. For example, although not illustrated in FIG. 4, the storage unit 30 may further include a shape information retention section. The shape information retention section retains dictionary data that contains a combination of one or more folding points in association with a shape of the oscillator 10 resulting from folding. The shape change detection section 42 may identify the shape of the oscillator 10 associated with the detected combination of one or more folding points by referring to dictionary data, thus identifying the shape as the current shape of the oscillator 10. In this case, the audio output condition of the criteria retention section 32 may be the fact that the oscillator 10 at present assumes a given shape.

It should be noted that if the manner in which the oscillator 10 is folded by the user is specified in advance (e.g., folding point or number of times it is folded), the shape information retention section of the storage unit 30 may retain the number of times the oscillator 10 is folded in association with shape information of the oscillator 10 resulting from folding. The shape change detection section 42 may count the number of times the oscillator 10 is folded (number of folds). Then, the shape change detection section 42 may identify, as a current shape of the oscillator 10, the shape associated with the identified number of folds.

A description will be given of the operation of the electroacoustic transducer 110 according to the second embodiment configured as described above.

The first operation example of the electroacoustic transducer 110 is as shown in FIG. 8. That is, the shape change detection section 42 detects the folding of the oscillator 10 (can be also said to be the electroacoustic transducer 110) by the user. The audio output control section 44 reproduces audio data stored in the audio data retention section 34 when the audio output condition is satisfied. It should be noted that the monitored item in S10 may be at least one of the following, namely, the ON/OFF statuses of the switches provided inside the oscillator 10, the change in electric resistance of the oscillator 10, the continuity condition, and the change in electromotive force thereof. The present mode provides, for example, a concert ticket that reproduces a number when folded.

The audio output condition may be the fact that the oscillator 10 assumes a specific shape (e.g., the shape of a crane). The shape change detection section 42 may identify the current shape of the oscillator 10 resulting from folding. If the oscillator 10 is in the specific shape, the audio output control section 44 may consider this as satisfaction of the audio output condition, thus reproducing audio data. In the present mode, the shape of the oscillator 10 may be used as a password for listening to a secret message. A possible scenario in this case would be that family members share a specific shape that permits audio output, and that only the family members, and not other parties, can listen to messages.

The audio data retention section 34 may store a plurality of types of audio data. The criteria retention section 32 may store, as an audio output condition, each of "possible folding points" in association with information representing the type of audio data to be output. Each of possible folding points is information representing the point or area of the oscillator 10 where the oscillator 10 is likely to be folded. The shape change detection section 42 may detect the folding point of the oscillator 10. The audio output control section 44 may reproduce the audio data associated with the possible folding point that matches the detected folding point. The present mode provides the electroacoustic transducer 110 that permits, for example, different numbers to be reproduced depending on where the oscillator 10 is folded. It should be noted that the number of folding points can be restricted by determining, in advance, folding points of the oscillator 10, i.e., the points of the oscillator 10 to be folded by the user.

The present mode allows a variety of audio outputs to be produced in accordance with the folding point resulting from a user's act. For example, a number of artist A may be reproduced when the oscillator 10 is folded at the first point. On the other hand, a number of artist B may be reproduced when the oscillator 10 is folded at the second point which is different from the first point.

A description will be given of an example in which the electroacoustic transducer 110 in the present mode is applied to a measurement device (includes tape measure and ruler). The scale of the measurement device encloses the oscillator 10. The audio data retention section 34 retains identification information of a plurality of folding points in association with audio data representing a length. This length may be the distance from the edge or starting point of the measurement device to the folding point. When the shape change detection section 42 detects a folding point of the measurement device, the audio output control section 44 reproduces audio data associated with the folding point. This provides a measurement device that reads out a length. It should be noted that each folding point may be associated with audio data representing half the distance from the edge to a folding point. In this case, when the user folds the measurement device at a given point, the measurement device may verbally announce half the distance from the edge to the folding point.

Further, if the audio data retention section 34 stores a plurality of types of audio data, the criteria retention section 32 may store, as an audio output condition, each of a plurality of possible shapes that can be assumed by the oscillator 10 in association with information representing the type of audio data to be output. The shape change detection section 42 may identify the current shape of the oscillator 10 resulting from folding, thus determining which of the possible shapes the current shape matches. The audio output control section 44 may reproduce audio data associated with the current shape of the oscillator 10.

The present mode provides an origami that talks when folded into a specific shape (into the shape of a crane in FIG. 3) as illustrated in FIG. 3. For example, the present mode provides an origami that barks like a dog when folded into the shape of a dog and the sound of the ball off the bat (e.g., "crack") when folded into the shape of a bat.

The second operation example of the electroacoustic transducer 110 is as shown in FIG. 9. That is, when the folding of the oscillator 10 (can be also said to be the electroacoustic transducer 110) by the user is detected, the audio recording section 46 acquires audio data from an external device and stores the audio data in the audio data retention section 34. When the given audio output condition is satisfied, the audio output control section 44 reproduces the audio data stored in the audio data retention section 34. As in the second operation example of the first embodiment, the present mode makes it possible to readily change or update the content of audio to be output from the electroacoustic transducer 110 by changing or updating audio data (e.g., audio data retained by the external device) provided by the external device as necessary.

The audio recording section 46 may record surrounding audio detected by the oscillator 10 to the audio data retention section 34 rather than acquiring audio data from an external device. On the other hand, the audio output condition may be the detection of the folding of the oscillator 10. In this case, the audio output control section 44 may immediately output audio if audio data is provided by an external device or if surrounding audio is recorded.

Figure 12:
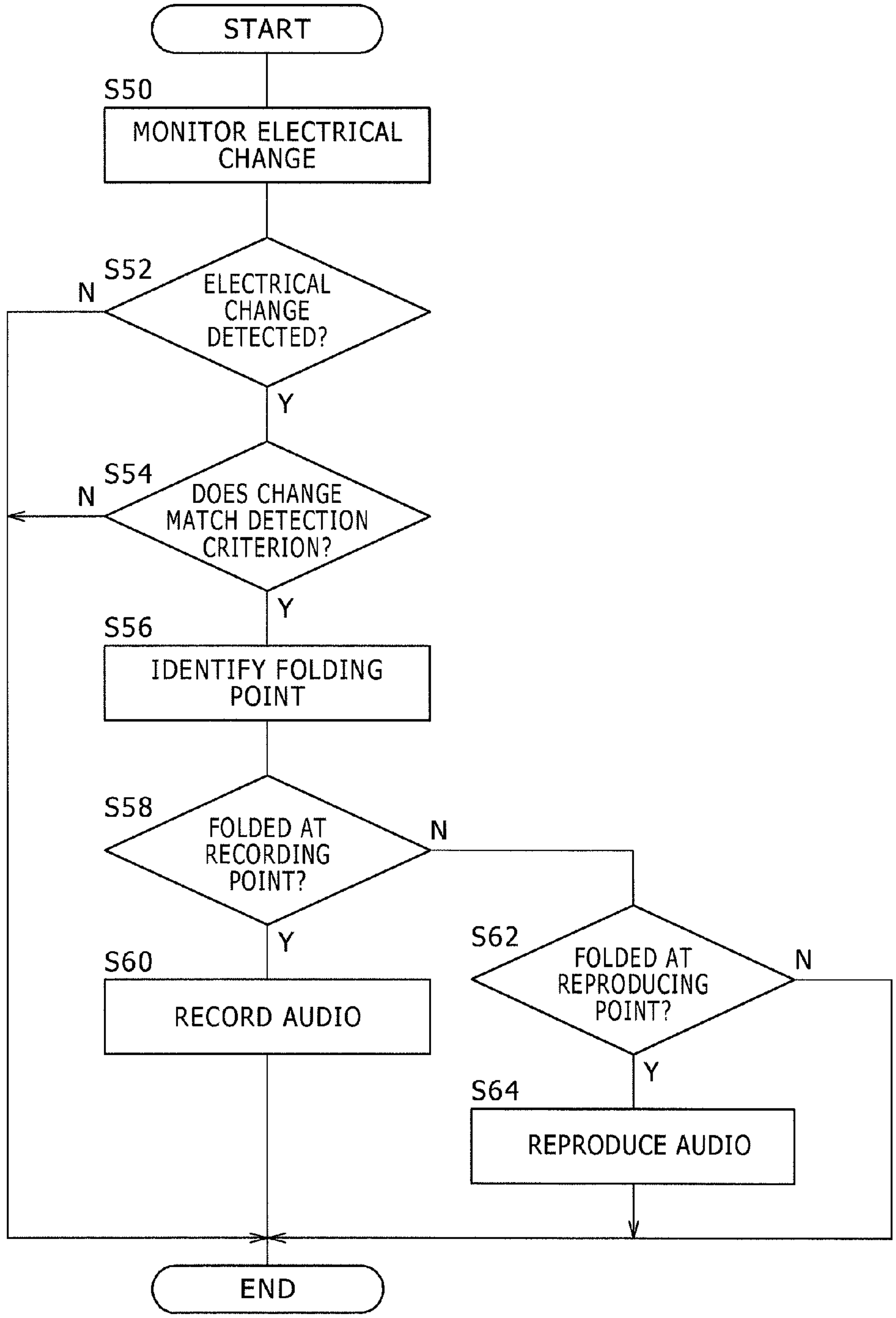
FIG. 12 is a flowchart illustrating a third operation example of the electroacoustic transducer.

FIG. 12 is a flowchart illustrating a third operation example of the electroacoustic transducer 110.

The shape change detection section 42 monitors the electrical change of a given monitored item of the oscillator 10 (S50). If an electrical change of the monitored item is detected (Y in S52), and if the manner in which the change occurs matches the shape change detection criterion (Y in S54), the shape change detection section 42 detects the folding point of the oscillator 10 (S56).

If the folding point is in accord with a given point for instructing that recording be initiated (hereinafter also referred to as a “recording point”) (Y in S58), the audio recording section 46 proceeds with audio recording (S60). The audio recording section 46 may acquire, via the oscillator 10, audio data derived from encoding surrounding audio, storing the audio data in the audio data retention section 34 for recording. Alternatively, the audio recording section 46 may acquire audio data from an external device, storing the audio data in the audio data retention section 34 for recording.

If the folding point is in accord with a given point for instructing that reproducing be initiated (hereinafter also referred to as a “reproducing point”) (Y in S62) although different from the recording point (N in S58), the audio output control section 44 proceeds with audio reproducing (S64). More specifically, the audio output control section 44 reproduces the audio data stored in the audio data retention section 34. If the folding point is neither the recording point nor the reproducing point (N in S62), the procedure shown in FIG. 12 is terminated. Further, if the electrical change of the oscillator 10 has yet to be detected (N in S52), or if the manner in which the change occurs does not match the shape change detection criterion (N in S54), the procedure shown in FIG. 12 is terminated.

It should be noted that although the shape change detection section 42 detects the folding point in FIG. 12, the shape of the oscillator 10 resulting from the folding may be identified as described earlier. In this case, the audio recording section 46 may record audio if the fact that the oscillator 10 changes into the given first shape is detected. The first shape is designed to instruct that recording be initiated. Further, the audio output control section 44 may reproduce audio if the fact that the oscillator 10 changes into the given second shape different from the first shape is detected. The second shape is designed to instruct that reproducing be initiated.

The third operation example of the electroacoustic transducer 110 provides a film speaker that processes audio differently in accordance with the folding point or the shape resulting from the folding. Among possible products using the electroacoustic transducer 110 are talking invitation card, birthday card, photograph, and postcard.

We consider here a next-generation invitation card that has four preset points, namely, a host recording point, a host reproducing point, a guest recording point, and a guest reproducing point. The host user folds the card at the host recording point and speaks a message to a guest into the card, thus storing the message in the electroacoustic transducer 110. When the guest user receives the invitation card, he or she folds the card at the guest reproducing point, thus listening to the message from the host user. Then, the guest user folds the card at the guest recording point and speaks a message to the host user into the card, thus storing the message in the electroacoustic transducer 110. When the host user receives the returned invitation card, he or she folds the card at the host reproducing point, thus listening to the message from the guest user.

In addition to the invitation card described above, it is possible to provide a read-out invitation card for visually handicapped, i.e., an invitation card that reads out a message when the card is folded at the reproducing point indicated, for example, by Braille markings. That is, the electroacoustic transducer 110 can assist in multimodal communication that promotes human-to-human communication through a plurality of means including visual and auditory means.

Third Embodiment (Hereinafter Also Referred to as Such)

The electroacoustic transducer 110 according to a third embodiment provides a film speaker which talks in coordination with an external information processor adapted to detect the change in shape of the electroacoustic transducer 110. That is, in the first and second embodiments, the change in shape of the electroacoustic transducer 110 is detected by the electroacoustic transducer 110. The third embodiment differs from the first and second embodiments in that the change in shape of the electroacoustic transducer 110 is detected by an external information processor.

Figure 13:
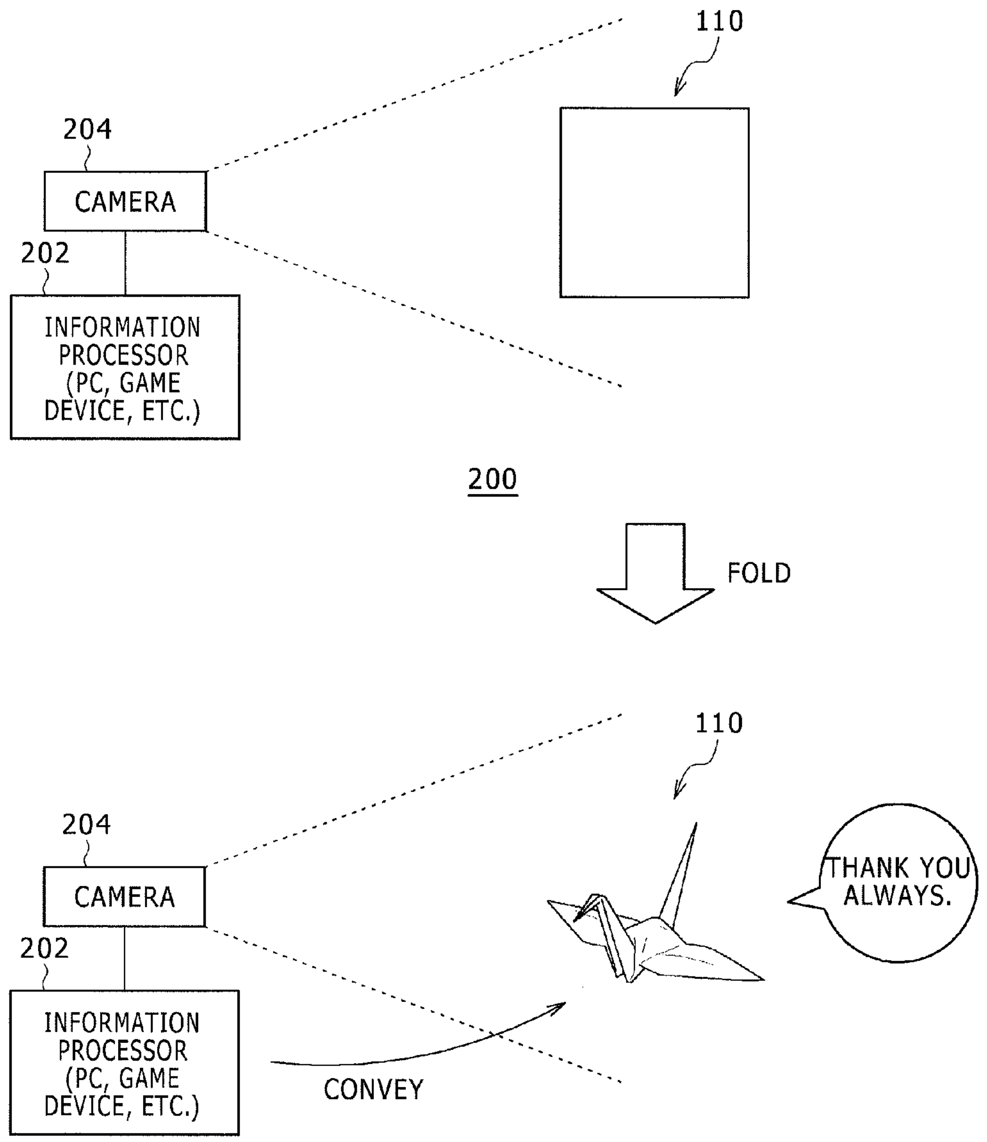
FIG. 13 is a diagram illustrating a configuration of an entertainment system including an electroacoustic transducer according to a third embodiment.

FIG. 13 illustrates a configuration of an entertainment system 200 including the electroacoustic transducer 110 in the third embodiment. A camera 204 is an imaging device adapted to image the appearance of the electroacoustic transducer 110. For example, the camera 204 may be a live camera, a realtime camera, or a web camera. An information processor 202 is an information processor connected to the camera 204. The information processor 202 is a PC, a stationary game device, or one of a variety of mobile terminals.

We assume here that the electroacoustic transducer 110 is folded into the shape of a crane. The information processor 202 detects the change in shape of the electroacoustic transducer 110 on the basis of imaging data acquired from the camera 204. The information processor 202 conveys, to the electroacoustic transducer 110, information about the detected change in shape. The electroacoustic transducer 110 outputs audio on the basis of the information conveyed from the information processor 202.

Figure 14:
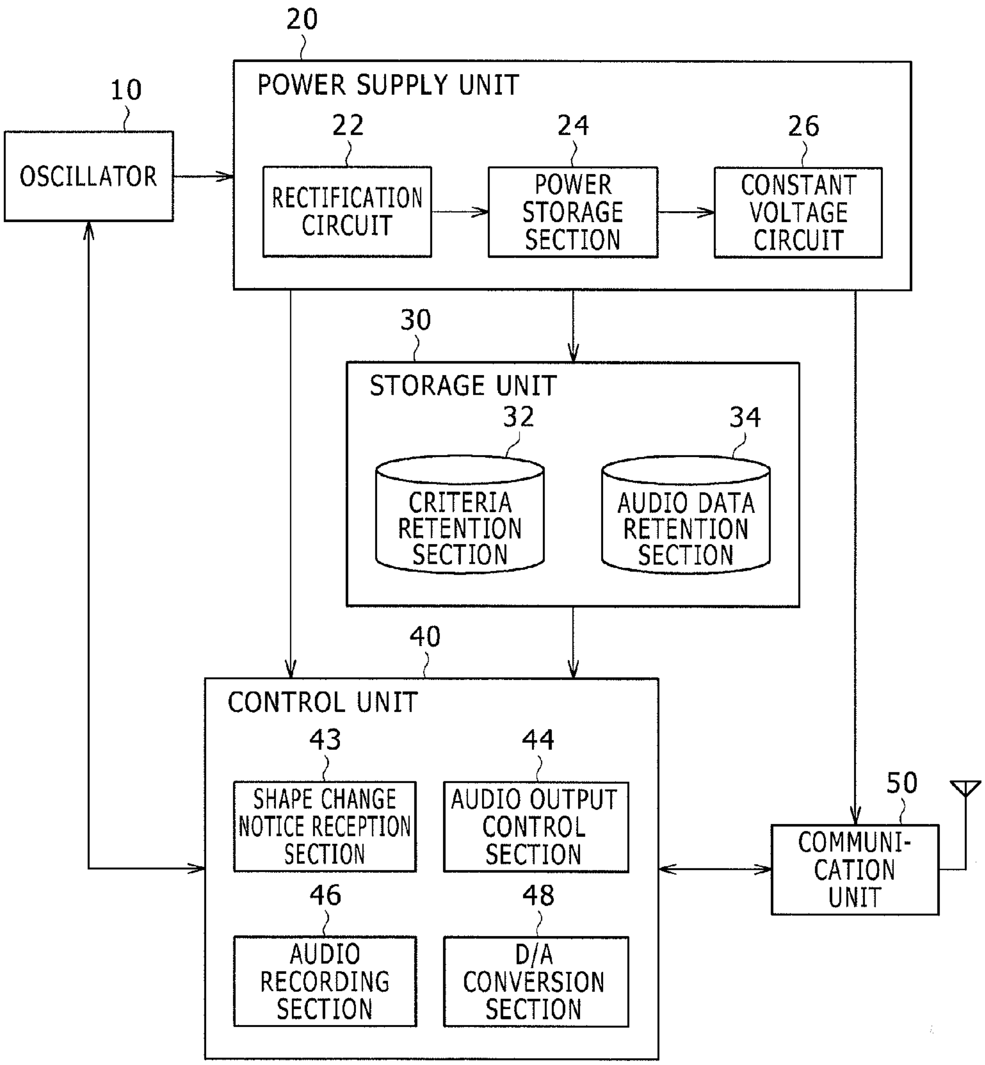
FIG. 14 is a block diagram illustrating a functional configuration of the electroacoustic transducer shown in FIG. 13.

FIG. 14 is a block diagram illustrating a functional configuration of the electroacoustic transducer 110 shown in FIG. 13. The criteria retention section 32 in the third embodiment retains an audio output condition, but not shape change detection criteria. On the other hand, the control unit 40 includes a shape change notice reception section 43 rather than the shape change detection section 42. Other components of the electroacoustic transducer 110 are the same as those of the electroacoustic transducer 110 in the first embodiment.

The shape change notice reception section 43 receives, via the communication unit 50, information about an apparent change in shape of the electroacoustic transducer 110 transmitted from the information processor 202 (hereinafter also referred to as "shape change notice").

Figure 15:
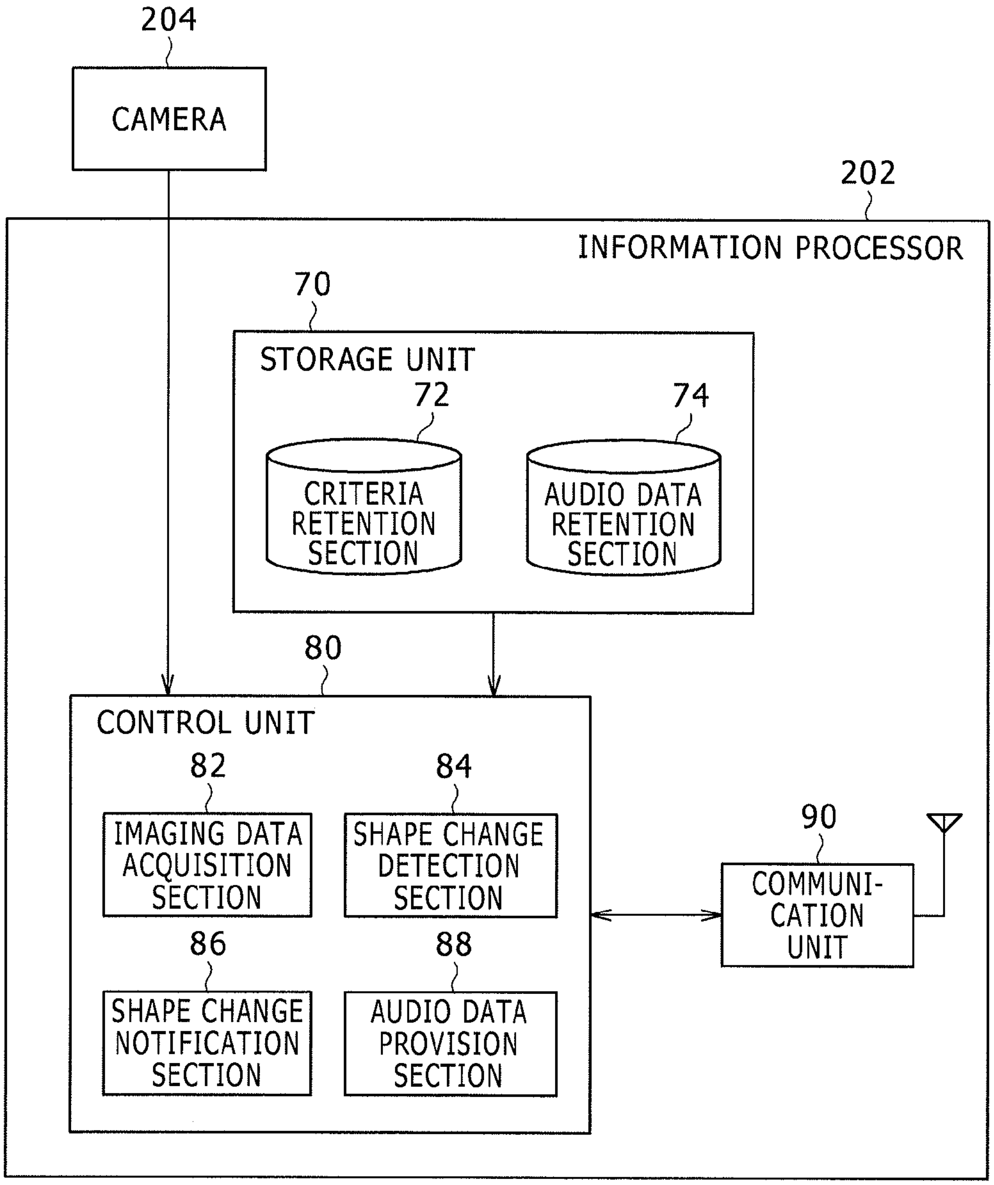
FIG. 15 is a block diagram illustrating a functional configuration of an information processor shown in FIG. 13.

FIG. 15 is a block diagram illustrating a functional configuration of the information processor 202 shown in FIG. 13. The information processor 202 includes a storage unit 70, a control unit 80, and a communication unit 90. Although FIG. 15 illustrates the functions for implementing a film speaker that talks in coordination with the electroacoustic transducer 110, it is a matter of course that the information processor 202 may further include known functions of an information processor. For example, the information processor 202 may further include an application execution unit adapted to execute a variety of applications such as games.

The communication unit 90 handles communication with external devices in accordance with a variety of communication protocols. In the third embodiment in particular, the communication unit 90 handles short-range wireless communication with the electroacoustic transducer 110.

The storage unit 70 includes a criteria retention section 72 and an audio data retention section 74. The control unit 80 includes an imaging data acquisition section 82, a shape change detection section 84, a shape change notification section 86, and an audio data provision section 88. Program modules for these functional blocks may be stored in a given storage medium and installed to the storage of the information processor 202. Further, the CPU of the information processor 202 may store the program modules in a main memory and execute these modules as appropriate, thus implementing the functions shown in FIG. 14.

The criteria retention section 72 corresponds to the criteria retention section 32 in the first embodiment. The criteria retention section 72 retains shape change detection criteria, reference data for detecting the apparent change in shape of the electroacoustic transducer 110 (in other words, the oscillator 10 of the electroacoustic transducer 110). The shape change detection criteria in the third embodiment are image data used for comparison against imaging data acquired from the camera 204.

The shape change detection criteria include image data representing the appearance of the electroacoustic transducer 110 when the electroacoustic transducer 110 is torn and that when the electroacoustic transducer 110 is folded. Typically, the shape change detection criteria include a plurality of image data for a plurality of tearing points and a plurality of image data for a plurality of folding points. Image data serving as shape change detection criteria will be hereinafter referred to as reference image data.

It should be noted that the shape change detection criteria may include information representing a specific shape of the electroacoustic transducer 110. For example, each of a plurality of reference image data may be retained in association with information representing the appearance of the electroacoustic transducer 110 represented by each of reference image data as shape change detection criteria. Here, information representing the appearance may be information representing tearing, folding, tearing at point 1, folding at point 2, rounding, the shape of a crane, that of a bat, that of a plane, and so on.

The audio data retention section 74 corresponds to the audio data retention section 34 in the first embodiment. The audio data retention section 74 retains audio data to be reproduced and output by the electroacoustic transducer 110.

The imaging data acquisition section 82 controls the operation of the camera 204. Further, the imaging data acquisition section 82 acquires imaging data generated by the camera 204 imaging the electroacoustic transducer 110.

The shape change detection section 84 corresponds to the shape change detection section 42 in the first embodiment. The shape change detection section 84 compares imaging data acquired by the imaging data acquisition section 82 against a plurality of reference image data stored as shape change detection criteria, thus detecting the apparent change in shape of the electroacoustic transducer 110. In this comparison, the shape change detection section 84 may perform a known image matching process.

For example, if the appearance of the electroacoustic transducer 110 represented by imaging data matches that represented by one of reference image data, the shape change detection section 84 may determine that the change in shape of the electroacoustic transducer 110 has occurred. Alternatively, if imaging data is in accord with reference image data different from data with which the imaging data was in accord during a previous determination, the shape change detection section 84 may determine that the change in shape of the electroacoustic transducer 110 has occurred.

If the shape change detection criteria include specific shape information of the electroacoustic transducer 110, the shape change detection section 84 may further identify the specific shape of the electroacoustic transducer 110 associated with the reference image data that matches imaging data. In the example shown in FIG. 13, the shape change detection section 84 may identify that the electroacoustic transducer 110 is currently in the shape of a crane.

If the shape change detection section 84 detects the change in shape of the electroacoustic transducer 110, the shape change notification section 86 transmits a shape change notice to the electroacoustic transducer 110 via the communication unit 90. A shape change notice may be information representing the change in shape of the electroacoustic transducer 110. Alternatively, a shape change notice may be information representing a specific shape of the electroacoustic transducer 110. Still alternatively, a shape change notice may be information representing a tearing or folding point.

The audio data provision section 88 transmits audio data, stored in the audio data retention section 74, to the electroacoustic transducer 110 via the communication unit 90.

Although not illustrated in FIG. 15, the control unit 80 may further include an audio data acquisition section. The audio data acquisition section accesses a given external server via the communication unit 90, acquiring audio data from the external server and storing the data in the audio data retention section 74. The audio data acquisition section may acquire, from the external server, audio data associated with the manner in which the electroacoustic transducer 110 changes its shape when this change occurs. For example, if the electroacoustic transducer 110 changes into the shape of a dog, the audio data acquisition section may acquire audio data representing the bow-wow of a dog. Further, the audio data acquisition section may regularly access an external server, acquiring audio data that is modified or updated regularly.

A description will be given of the operation of the information processor 202 and the electroacoustic transducer 110 configured as described above.

Figure 16:
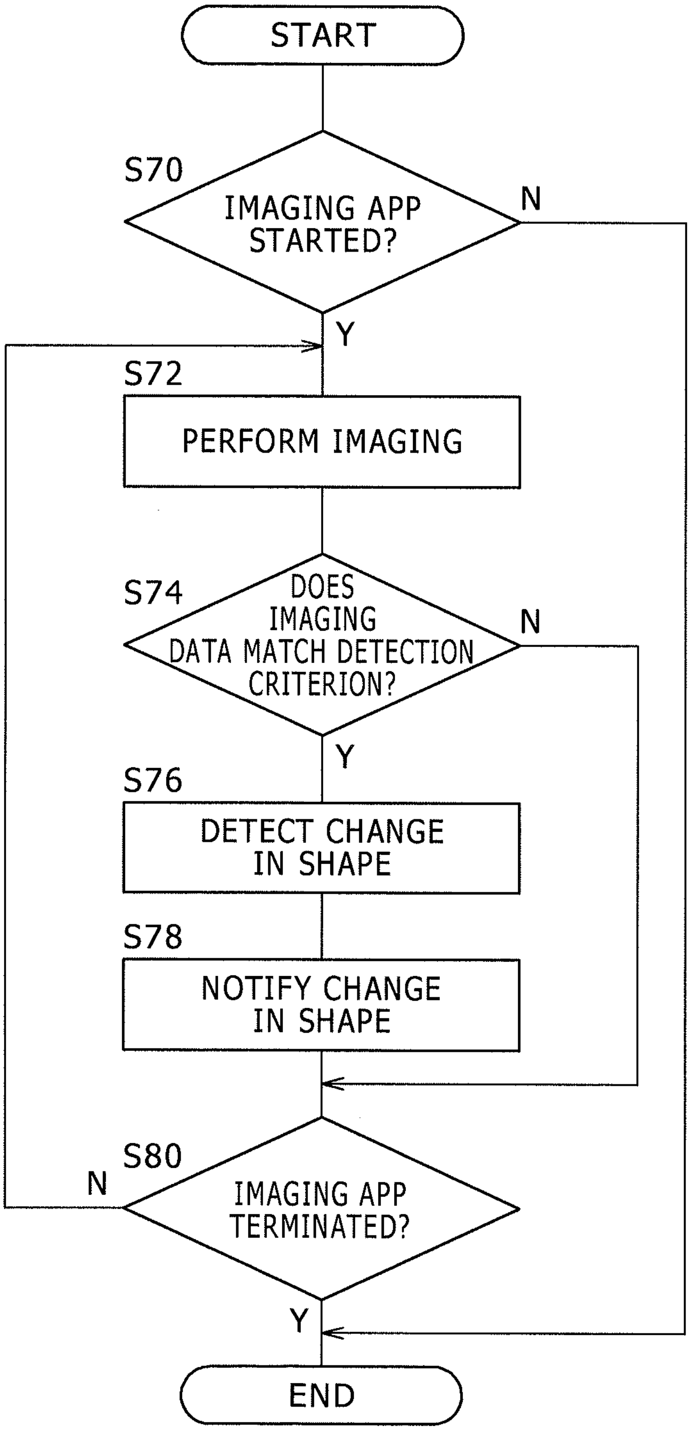
FIG. 16 is a flowchart illustrating a first operation example of the information processor.

FIG. 16 is a flowchart illustrating a first operation example of the information processor 202. When an imaging application is started in the information processor 202 (Y in S70), the imaging data acquisition section 82 starts imaging with the camera 204, acquiring imaging data from the camera 204 (S72). The imaging application may be an application adapted to control audio processing of the electroacoustic transducer 110. Alternatively, the imaging application may be a game application adapted to display a game that uses the electroacoustic transducer 110.

If the imaging data acquired from the camera 204 matches the shape change detection criterion (Y in S74), the shape change detection section 84 detects the change in shape of the electroacoustic transducer 110 (S76). As described earlier, the shape change detection section 84 may identify the current shape of the electroacoustic transducer 110. The shape change notification section 86 transmits a shape change notice regarding the current shape to the electroacoustic transducer 110 (S78). If the imaging data does not match the shape change criterion (N in S74), S76 and S78 are skipped.

If the execution of the imaging application is continued in the information processor 202 (N in S80), control returns to S72 to acquire imaging data again. If the execution of the imaging application is terminated (Y in S80), the procedure in FIG. 16 is terminated. If the imaging application has yet to be started (N in S70), the steps from S72 onwards are skipped to terminate the procedure in FIG. 16.

Figure 17:
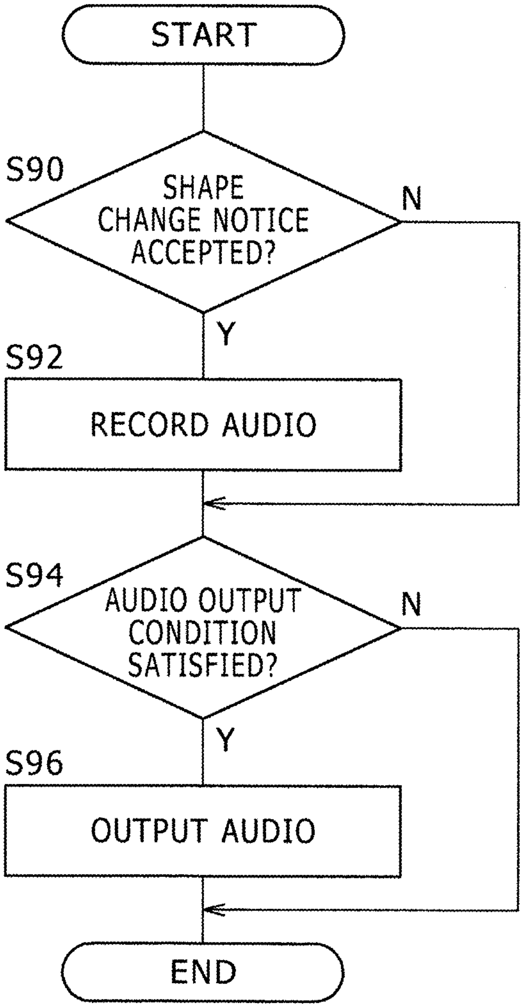
FIG. 17 is a flowchart illustrating a first operation example of the electroacoustic transducer.

FIG. 17 is a flowchart illustrating a first operation example of the electroacoustic transducer 110 for the first operation example of the information processor 202. When the shape change notice reception section 43 receives a shape change notice (Y in S90), the audio recording section 46 acquires audio data based on surrounding audio via the oscillator 10, storing the audio data in the audio data retention section 34 (S92). If the shape change notice reception section 43 has yet to receive a shape change notice (N in S90), S92 is skipped. When the audio output condition is satisfied (Y in S94), the audio output control section 44 outputs, via the oscillator 10, audio based on the audio data stored in the audio data retention section 34 (S96). If the audio output condition has yet to be satisfied (N in S94), S96 is skipped.

Although FIG. 17 illustrates a case in which surrounding audio is recorded when a shape change notice is received, audio data may be acquired from the information processor 202 as in the first and second embodiments. Further, if audio data to be reproduced is stored in advance in the audio data retention section 34, recording in S92 may be skipped. Further, the audio output condition may be reception of a shape change notice. That is, the electroacoustic transducer 110 may reproduce and output the audio data stored in the audio data retention section 34 in advance immediately when a shape change notice is received.

Figure 18:
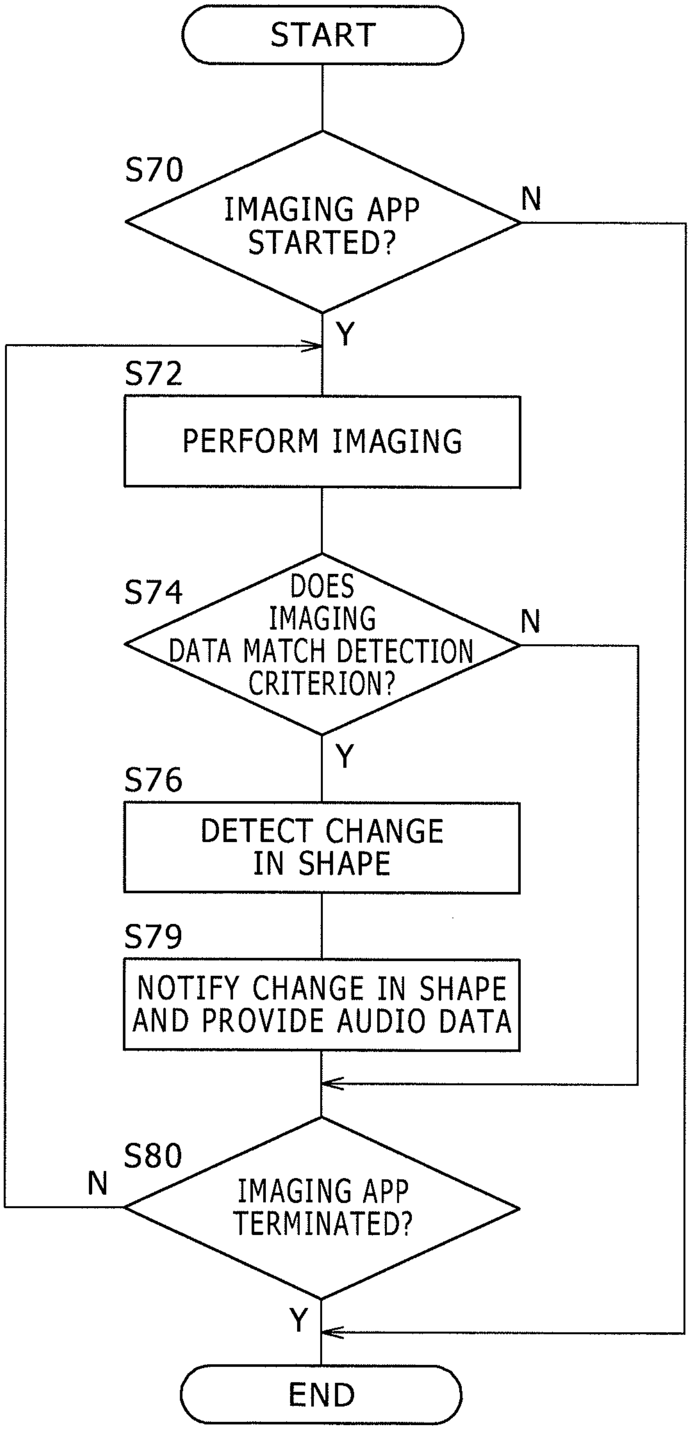
FIG. 18 is a flowchart illustrating a second operation example of the information processor.

FIG. 18 is a flowchart illustrating a second operation example of the information processor 202. In the second operation example, the step in S79 is performed rather than the step in S78 in the first operation example. That is, when the change in shape of the electroacoustic transducer 110 is detected, the shape change notification section 86 transmits a shape change notice to the electroacoustic transducer 110, and at the same time, the audio data provision section 88 transmits given audio data to the electroacoustic transducer 110 (S79). Other steps are the same as those in the first operation example (FIG. 16).

Figure 19:
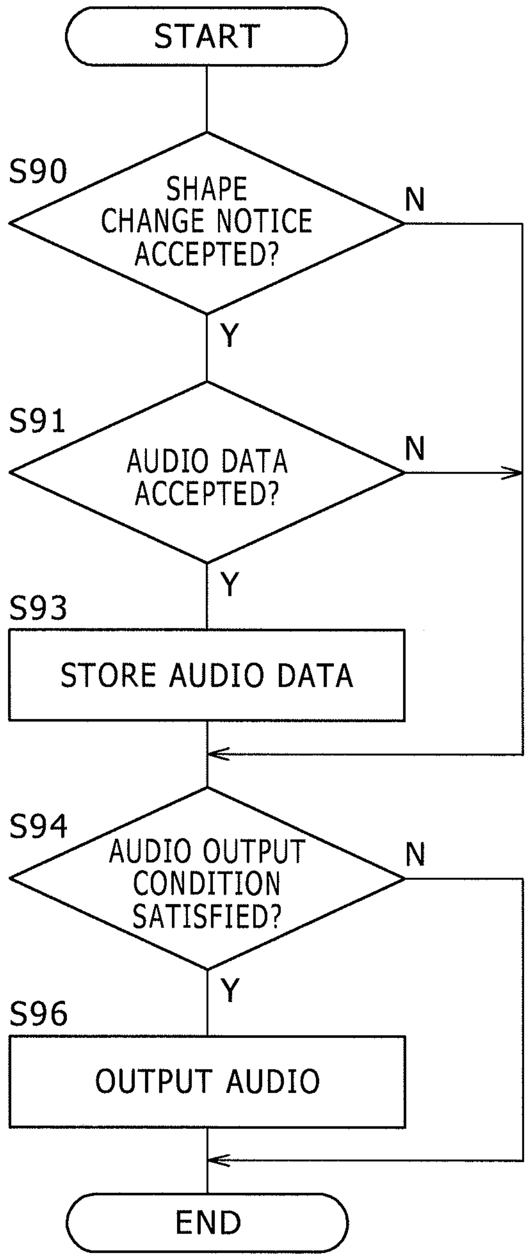
FIG. 19 is a flowchart illustrating a second operation example of the electroacoustic transducer.

FIG. 19 is a flowchart illustrating a second operation example of the electroacoustic transducer 110 for the second operation example of the information processor 202. When the shape change notice reception section 43 receives a shape change notice (Y in S90), the audio recording section 46 goes on standby to wait for audio data. When the audio recording section 46 receives audio data from the information processor 202 (Y in S91), the audio recording section 46 stores the received audio data in the audio data retention section 34 (S93). If a shape change notice has yet to be received (N in S90), or if audio data has yet to be received (N in S91), S93 is skipped. The steps in S94 and S96 are the same as those in the first operation example (FIG. 17). The mode shown in the second operation example makes it possible to readily change or update the content of audio to be output from the electroacoustic transducer 110 by changing or updating audio data provided by the information processor 202 as necessary.

In the third embodiment, the information processor 202 detects the change in shape of the electroacoustic transducer 110 on the basis of imaging data produced by the camera 204. The third embodiment contributes to improved accuracy in shape change detection thanks to shape change detection based on images and normally higher data processing capability of the information processor 202 than that of the electroacoustic transducer 110.

Further, as described earlier, the third embodiment differs from the first and second embodiments in what reproduces a main role in detecting the change in shape of the electroacoustic transducer 110. Therefore, the processes (e.g., recording and outputting audio) handled by the electroacoustic transducer 110 after detection of the change in shape thereof can be performed in the various modes described in the first and second embodiments.

For example, the information processor 202 may transmit, to the electroacoustic transducer 110, information representing the current shape after the change (e.g., shape of a crane), or information representing the tearing or folding point as a shape change notice. The electroacoustic transducer 110 may proceed with audio recording or output described earlier in the first and second embodiments on the basis of the current shape, the tearing point, or the folding point of the electroacoustic transducer 110 conveyed from the information processor 202.

Further, although not illustrated in FIGS. 15 and 17, if the change in shape of the electroacoustic transducer 110 is detected by the shape change detection section 84, the application execution unit of the information processor 202 may reflect the fact of the detection in the execution results of the application. This ensures that audio output from the electroacoustic transducer 110 whose shape has been changed by the user is linked to the application execution results, thus providing the user with a novel entertainment experience.

For example, the application execution unit may change the game application reproduction results in accordance with the shape of the electroacoustic transducer 110 after the change, or the tearing or folding point thereof. As a specific example, if the user folds the electroacoustic transducer 110 into the shape of a dog during a battle against an enemy character in a game, the application execution unit may display a dog on the screen as an ally character. The shape change notification section 86 may transmit a shape change notice to the electroacoustic transducer 110 synchronously when a dog appears on the screen. The electroacoustic transducer 110 in the shape of a dog may output pre-stored audio data or a bow-wow sound provided by the information processor 202 when a shape change notice is received.

Thus, the present disclosure has been described on the basis of three embodiments. It is to be understood by those skilled in the art that these embodiments are illustrative, that the combination of components and processes can be modified in various ways, and that such modification examples also fall within the scope of the present disclosure.

Although, in the third embodiment, the electroacoustic transducer 110 retains an audio output condition, the information processor 202 may retain an audio output condition as a modification example, thus determining whether the audio output condition is satisfied. Applying this to the first operation example, the information processor 202 may notify the electroacoustic transducer 110 of this effect if the audio output condition is satisfied. The electroacoustic transducer 110 may reproduce and output audio data if the satisfaction of the audio output condition is notified. Applying this to the second operation example, the information processor 202 may transmit audio data to the electroacoustic transducer 110 if the audio output condition is satisfied. When the electroacoustic transducer 110 receives audio data from the information processor 202, the electroacoustic transducer 110 may immediately reproduce and output the audio data.

Any combination of one of the above embodiments and one of the modification examples is also effective as an embodiment of the present disclosure. A new embodiment resulting from a combination has advantageous effects of the original embodiment and modification example. On the other hand, it should be understood by those skilled in the art that the function to be served by each of the components described in the claims is implemented by each of the components shown in the embodiments and modification examples alone or in combination.

The present technology contains subject matter related to that disclosed in Japanese Priority Patent Application JP 2015-006585 filed in the Japan Patent Office on Jan. 16, 2015, the entire content of which is hereby incorporated by reference.

What is claimed is:

1. An electroacoustic transducer comprising:
an oscillator formed in a film shape;
a detection section adapted to detect the apparent change in shape of the oscillator resulting from a user's act; and
an audio output section adapted to automatically output audio file from data stored in a given storage area via the oscillator after the change in shape is detected.

2. The electroacoustic transducer of claim 1, wherein
the detection section detects the change in shape of the oscillator resulting from the tearing or folding of the oscillator by the user.

3. The electroacoustic transducer of claim 1, wherein
the detection section detects a point where the oscillator changes its shape, and
the audio output section outputs the audio file proportional to the point.

4. The electroacoustic transducer of claim 1, wherein
the audio output section outputs the audio file if the change of the oscillator into a predetermined specific shape is detected.

5. The electroacoustic transducer of claim 4, wherein
the audio output section outputs a first audio file if the change of the oscillator into a first shape is detected, and outputs a second audio file different from the first audio file if the change of the oscillator into a second shape different from the first shape is detected.

6. An electroacoustic transducer comprising:
an oscillator formed in a film shape;
a detection section adapted to detect the apparent change in shape of the oscillator resulting from a user's act;
an audio recording section adapted to store given audio data in a given storage area if the change in shape is detected; and
an audio output section adapted to output audio based on audio data stored in the storage area via the oscillator if a given condition is satisfied.

7. The electroacoustic transducer of claim 6, wherein
the audio recording section communicates with a given external device so as to store audio data, provided by the external device, in the storage area.

8. The electroacoustic transducer of claim 6, wherein
the audio recording section acquires audio data based on surrounding audio via the oscillator so as to store the audio data in the storage area.

9. The electroacoustic transducer of claim 6, wherein
the audio recording section stores given audio data in the storage area if the change of the oscillator into a first shape is detected, and
the audio output section outputs audio based on audio data stored in the storage area if the change of the oscillator into a second shape different from the first shape is detected.

10. An electroacoustic transducer comprising:
an oscillator formed in a film shape;
a reception section adapted to receive information about the change in shape transmitted from an external device that has detected the apparent change in shape of the oscillator resulting from a user's act; and
an audio output section adapted to output audio based on audio data stored in a given storage area via the oscillator if information about the shape change is received.

11. The electroacoustic transducer of claim 10 further comprising
an audio recording section adapted to store given audio data in the given storage area if information about the shape change is received.

12. An information processor comprising:
an acquisition section adapted to acquire imaging data from an imaging device adapted to image an electroacoustic transducer that includes an oscillator formed in a film shape;
a detection section adapted to detect the apparent change in shape of the oscillator resulting from a user's act based on the imaging data; and
a notification section adapted to cause the electroacoustic transducer to output audio based on given audio data via the oscillator by transmitting, to the electroacoustic transducer, information about the change in shape if such a change is detected.

13. An electroacoustic transducer comprising:
an oscillator formed in a film shape;
a reception section adapted to receive information about the change in shape transmitted from an external device that has detected the apparent change in shape of the oscillator resulting from a user's act;
an audio recording section adapted to store given audio data in a given storage area if the information about the change in shape is detected; and an audio output section adapted to output audio based on audio data stored in the storage area via the oscillator if a given condition is satisfied.

14. An information processor comprising:

an acquisition section adapted to acquire imaging data from an imaging device adapted to image an electroacoustic transducer that includes an oscillator formed in a film shape;

a detection section adapted to detect the apparent change in shape of the oscillator resulting from a user's act on the basis of the imaging data; and a notification section adapted to cause the electroacoustic transducer to store given audio data to be output via the oscillator if a given condition is satisfied by transmitting, to the electroacoustic transducer, information about the change in shape if such a change is detected.

* * * * *